(12) United States Patent
Raj Susairaju et al.

(10) Patent No.: US 12,273,484 B2
(45) Date of Patent: *Apr. 8, 2025

(54) SYSTEM AND METHOD FOR CENTRALIZED MULTICHANNEL OUTBOUND CALL CAMPAIGN MANAGEMENT

(71) Applicant: Acqueon Technologies Inc., Dallas, TX (US)

(72) Inventors: Ashok Raj Susairaju, Chennai (IN); Ashish Koul, San Jose, CA (US)

(73) Assignee: ACQUEON TECHNOLOGIES INC., Irving, TX (US)

(*) Notice: Subject to any disclaimer, the term of this patent is extended or adjusted under 35 U.S.C. 154(b) by 234 days.

This patent is subject to a terminal disclaimer.

(21) Appl. No.: 17/973,339

(22) Filed: Oct. 25, 2022

(65) Prior Publication Data

US 2023/0110404 A1 Apr. 13, 2023

Related U.S. Application Data

(63) Continuation-in-part of application No. 17/571,526, filed on Jan. 9, 2022, now Pat. No. 11,483,429, which is a continuation of application No. 17/348,545, filed on Jun. 15, 2021, now Pat. No. 11,223,722.

(60) Provisional application No. 63/130,014, filed on Dec. 23, 2020.

(51) Int. Cl.
*H04M 3/00* (2024.01)
*G06Q 10/0631* (2023.01)
*H04M 3/51* (2006.01)

(52) U.S. Cl.
CPC .... *H04M 3/5158* (2013.01); *G06Q 10/06311* (2013.01); *H04M 3/5183* (2013.01)

(58) Field of Classification Search
CPC .............. H04M 3/5158; H04M 3/5183; G06Q 10/06311
USPC .......................... 379/201.01, 265.01–265.14, 379/266.01–266.1, 309
See application file for complete search history.

(56) References Cited

U.S. PATENT DOCUMENTS

| | | |
|---|---|---|
| 8,548,133 B1 | 10/2013 | Koster |
| 8,699,699 B1 | 4/2014 | Anisimov et al. |
| 9,635,182 B2 | 4/2017 | Segall |

(Continued)

*Primary Examiner* — William J Deane, Jr.
(74) *Attorney, Agent, or Firm* — Galvin Patent Law LLC; Brian R. Galvin

(57) ABSTRACT

A system and method for centralized multichannel campaign management using digital consent acquisition, comprising: a campaign manager console, configured to allow an enterprise, such as a contact center, to create, configure, monitor, and deploy outbound call campaigns; a list manager configured to store, retrieve, create, and transform lists of numbers which can be used in the call campaign; a digital consent manager configured integrate with a plurality of digital channels in order to transmit to and receive messages from a consumer device in order to obtain consumer consent for a telephone call prior to a call being made by one or more auto-dialer systems; and a consumer device comprising a software application configured to connect with the digital consent manager via one or more integrated digital channels to so that the user of the consumer device can provide consent for a call to be received.

20 Claims, 20 Drawing Sheets

(56) References Cited

U.S. PATENT DOCUMENTS

2021/0176286 A1\* 6/2021 Unitt .................... H04L 67/01
2023/0283719 A1\* 9/2023 DiMaria ............ H04M 3/5231
                                                      379/209.01

\* cited by examiner

```
┌─────────────────────────────────────────────────────────────┐
│ facilitate a tethered connection between an agent desktop    │
│                    and an auto-dialer                        │
│                            510                               │
└─────────────────────────────────────────────────────────────┘
                              ↓
┌─────────────────────────────────────────────────────────────┐
│       allow contact center agents to establish agent         │
│                         availability                         │
│                            520                               │
└─────────────────────────────────────────────────────────────┘
                              ↓
┌─────────────────────────────────────────────────────────────┐
│  display at least one customer number from at least one     │
│    customer record delivered from a data services engine    │
│                            530                               │
└─────────────────────────────────────────────────────────────┘
                              ↓
┌─────────────────────────────────────────────────────────────┐
│    allow agents to interact with the at least one customer  │
│                            record                            │
│                            540                               │
└─────────────────────────────────────────────────────────────┘
                              ↓
┌─────────────────────────────────────────────────────────────┐
│  automatically dial any number of received Prior Express    │
│               Written Consent customer records               │
│                            550                               │
└─────────────────────────────────────────────────────────────┘
                              ↓
┌─────────────────────────────────────────────────────────────┐
│ establish a tethered connection between a Prior Express     │
│ Written Consent customer record and any designated          │
│           recipient for the communication                    │
│                            560                               │
└─────────────────────────────────────────────────────────────┘
                              ↓
┌─────────────────────────────────────────────────────────────┐
│ dial the customer number that has been forwarded from an    │
│                       agent desktop                          │
│                            570                               │
└─────────────────────────────────────────────────────────────┘
                              ↓
┌─────────────────────────────────────────────────────────────┐
│  establish a tethered connection between a designated       │
│         recipient and the dialed customer number            │
│                            580                               │
└─────────────────────────────────────────────────────────────┘
```

Fig. 5

SYSTEM AND METHOD FOR CENTRALIZED MULTICHANNEL OUTBOUND CALL CAMPAIGN MANAGEMENT

CROSS-REFERENCE TO RELATED APPLICATIONS

Priority is claimed in the application data sheet to the following patents or patent applications, the entire written description of each of which is expressly incorporated herein by reference in its entirety:
Ser. No. 17/571,526
Ser. No. 17/348,545
63/130,014

BACKGROUND

Field of the Art

The disclosure relates to the field of call center technology, and more particularly to the field of contact campaign management for non-bifurcated consent-based lists of end-users.

Discussion of the State of the Art

In the contact center industry, certain legislation, and regulations such as the Telephone Consumer Protection Act ("TCPA") provide requirements for contact center compliance from the Federal government, which offer protection to consumers and restrict unwanted calls in a number of ways. In particular, the TCPA: mandates prior expressed written consent ("PEWC") from consumers before dialing them using an auto-dialing system, for commercial/advertisement/for-profit purposes; restricts making of telemarketing calls and the use of auto-dialer, artificial or pre-recorded voice messages for non-PEWC customers; no longer allows telemarketers to use an "established business relationship" to avoid getting consent from consumers; and requires to provide an automated, interactive "opt-out" mechanism during each auto-dialed call.

A large number of Business Process Outsourcing ("BPO") and collection agencies are contracted out to dial calls on behalf of enterprise clients, because the enterprise clients may not have PEWC for the end customers, and therefore the enterprises are refrained from using predictive dialers or automated calling services to contact the customers, thus impacting agent and organization productivity. Further, enterprises which operate their own contact center or centers run into a similar constraint when calling their customers with phone numbers that are in their records, but which are not recorded as having their PEWC.

Some organizations in the market today offer a solution where the enterprise customer is asked to split their end customer records and offer it as two distinct lists, one being a list with PEWC and one being a list of non-PEWC end customers. The list of PEWC end customers is dialed by a predictive auto-dialer platform which is handled by one set of agents. The other list, with phone numbers that have not given PEWC, is first sent to a group of agents who use software to click on the provided phone numbers and once clicked, the number goes to an auto-dialer and those calls get initiated and connected to another group of agents dedicated and connected to this separate dialer system.

The disadvantage of this solution is that the agents cannot be blended to handle both calls and cannot be toggled between these two forms of dialers in real-time, based on the volume of records or call traffic, and they have limitation in blending these agents with inbound traffic, due to the fact that many enterprise customers wish to use other vendors for their inbound traffic such as for customer service agents.

What is needed is a system and method for multichannel outbound call campaign management which provides a digital plus multiple dialer architecture, wherein one or more digital channels may be used to initiate contact with a customer to obtain customer consent for calls, and which executes outbound calls using traditional audio channels.

SUMMARY

Accordingly, the inventor has conceived and reduced to practice, a system and methods for centralized multichannel campaign management using digital consent acquisition, comprising: a campaign manager console, configured to allow an enterprise, such as a contact center, to create, configure, monitor, and deploy outbound call campaigns; a list manager configured to store, retrieve, create, and transform lists of numbers which can be used in the call campaign; a digital consent manager configured integrate with a plurality of digital channels in order to transmit to and receive messages from a consumer device in order to obtain consumer consent for a telephone call prior to a call being made by one or more auto-dialer systems; and a consumer device comprising a software application configured to connect with the digital consent manager via one or more integrated digital channels to so that the user of the consumer device can provide consent for a call to be received.

According to a first preferred embodiment, a system for centralized multichannel campaign management is disclosed, comprising: a digital consent manager comprising at least a first plurality of programming instructions stored in the at least one memory of, and operating on at least one processor of, the computer system, wherein the first plurality of programming instructions, when operating on the at least one processor, cause the computer system to: receive a customer records list comprising a plurality of customer records without prior express written consent, where each record comprises a corresponding phone number and parameters specific to the phone number; parse a customer record to identify a parameter that indicates a digital channel associated with a customer; establish a connection with the customer mobile device via the identified digital channel; generate and send a message to the customer mobile device via the identified digital channel, wherein the message comprises a request for customer consent; receive a response to the message from the customer mobile device, wherein the response comprises an indication of consent and a campaign type; and update the customer record based on the indication of consent, wherein updating the customer record causes the customer record to be added to a customer records list comprising a plurality of customer records with prior express written consent, wherein each record comprises a corresponding customer phone number, campaign type, and parameters specific to the phone number; and a customer mobile device, the customer mobile device comprising at least a first plurality of programming instructions stored in at least one memory of, and operating on at least one processor of, the mobile device, wherein the first plurality of programming instructions, when operating on the at least one processor, cause the mobile device to: connect with the digital consent manager via the digital channels; receive the message via the digital channels; and send the response to the message to the digital consent manager, wherein the response comprises the indication of consent; and a campaign manager console comprising at least a second plurality of programming instructions stored in the at least one memory of, and operating on at least one processor of, the computer system, wherein the second plurality of programming instructions, when operating on the at least one processor, cause the computer system to: select and deliver a prior express written consent record to an auto-dialer; and an auto-dialer comprising at least a third plurality of programming instructions stored in the at least one memory of, and operating on at least one processor of, the computer system, wherein the third plurality of programming instructions, when operating on the at least one processor, cause the computer system to: automatically dial a corresponding customer phone number of a received prior express written consent customer record; and establish a tethered connection between one or more communications devices and the dialed corresponding customer phone number.

According to a second preferred embodiment, a method for centralized multichannel campaign management is disclosed, comprising the steps of: receiving, using digital consent manager, a customer records list comprising a plurality of customer records without prior express written consent, where each record comprises a corresponding phone number and parameters specific to the phone number; parsing, using the digital consent manager, a customer record to identify a parameter that indicates a digital channel associated with a customer; establishing, using the digital consent manager, a connection with the customer mobile device via the identified digital channel; generating, using the digital consent manager, and send a message to the customer mobile device via the identified digital channel, wherein the message comprises a request for customer consent; receiving, using the digital consent manager, a response to the message from the customer mobile device, wherein the response comprises an indication of consent; updating, using the digital consent manager, the customer record based on the indication of consent, wherein updating the customer record causes the customer record to be added to a customer records list comprising a plurality of customer records with prior express written consent, wherein each record comprises a corresponding customer phone number and parameters specific to the phone number; connecting, using a customer mobile device, with the digital consent manager via the digital channels; receiving, using the customer mobile device, the message via the digital channels; sending, using the customer mobile device, the response to the message to the digital consent manager, wherein the response comprises the indication of consent; selecting and delivering, using a campaign manager console, a prior express written consent record to an auto-dialer; automatically dialing, using an auto-dialer, a corresponding customer phone number of a received prior express written consent customer record; and establishing, using the auto-dialer, a tethered connection between one or more communications devices and the dialed corresponding customer phone number.

According to an aspect of an embodiment, wherein the digital channel is a blockchain network.

According to an aspect of an embodiment, wherein the message is a smart contract executed on the blockchain network, the smart contract comprising a request for customer consent, and wherein the customer record is stored on a blockchain of the blockchain network.

According to an aspect of an embodiment, wherein the digital channel uses biometric authentication to obtain consent.

According to an aspect of an embodiment, wherein the customer mobile device is further configured to: store a biometric profile associated with the user of the customer mobile device; receive biometric data from one or more on device sensors; and provide consent by authenticating the mobile device user, wherein authentication is performed by comparing the biometric data with the stored biometric profile and indicating a positive or negative match.

According to an aspect of an embodiment, wherein the digital channel is an email service, a messaging service, a social media service, an embedded link, or a scannable barcode.

According to an aspect of an embodiment, an agent desktop comprising at least a fourth plurality of programming instructions stored in the at least one memory of, and operating on at least one processor of, the computer system, wherein the fourth plurality of programming instructions, when operating on the at least one processor, cause the computer system to: display one or more non-prior express written consent customer records; and forward at least one non-prior express written consent customer record to the auto-dialer.

According to an aspect of an embodiment, a data services engine comprising at least a fifth plurality of programming instructions stored in the at least one memory of, and operating on at least one processor of, the computer system, wherein the fifth plurality of programming instructions, when operating on the at least one processor, cause the computer system to: determine availability of the agent desktop for one or more non-prior express written consent customers; reserve the agent desktop for the one or more non-prior express written consent customers; and tether a connection between the agent desktop and an auto-dialer.

According to an aspect of an embodiment, a traffic shaper comprising at least a sixth plurality of programming instructions stored in the at least one memory of, and operating on at least one processor of, the computer system, wherein the sixth plurality of programming instructions, when operating on the at least one processor, cause the computer system to: receive non-prior express written consent records; and request to reserve agents from the data services engine once non-prior express written consent record numbers cross a predetermined threshold.

According to an aspect of an embodiment, wherein all non-prior express written consent customer records are dialed with a simple dialer rather than an auto-dialer, wherein the agent desktop interaction with the at least one non-prior express written consent customer record forwards the customer record with a corresponding phone number to a simple dialer; and further comprising a simple dialer comprising at least a seventh plurality of programming instructions stored in the at least one memory of, and operating on at least one processor of, the computer system, wherein the seventh plurality of programming instructions, when operating on the at least one processor, cause the computer system to: receive a forwarded non-prior express written consent customer record from an agent desktop; dial the customer number that has been forwarded from an agent desktop; and establish a tethered connection between a prior express written consent customer record and one or more communication devices, after dialing a number.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary and are not to be considered as limiting of the scope of the invention or the claims herein in any way.

FIG. 5 is a method diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents.

Figure 6:
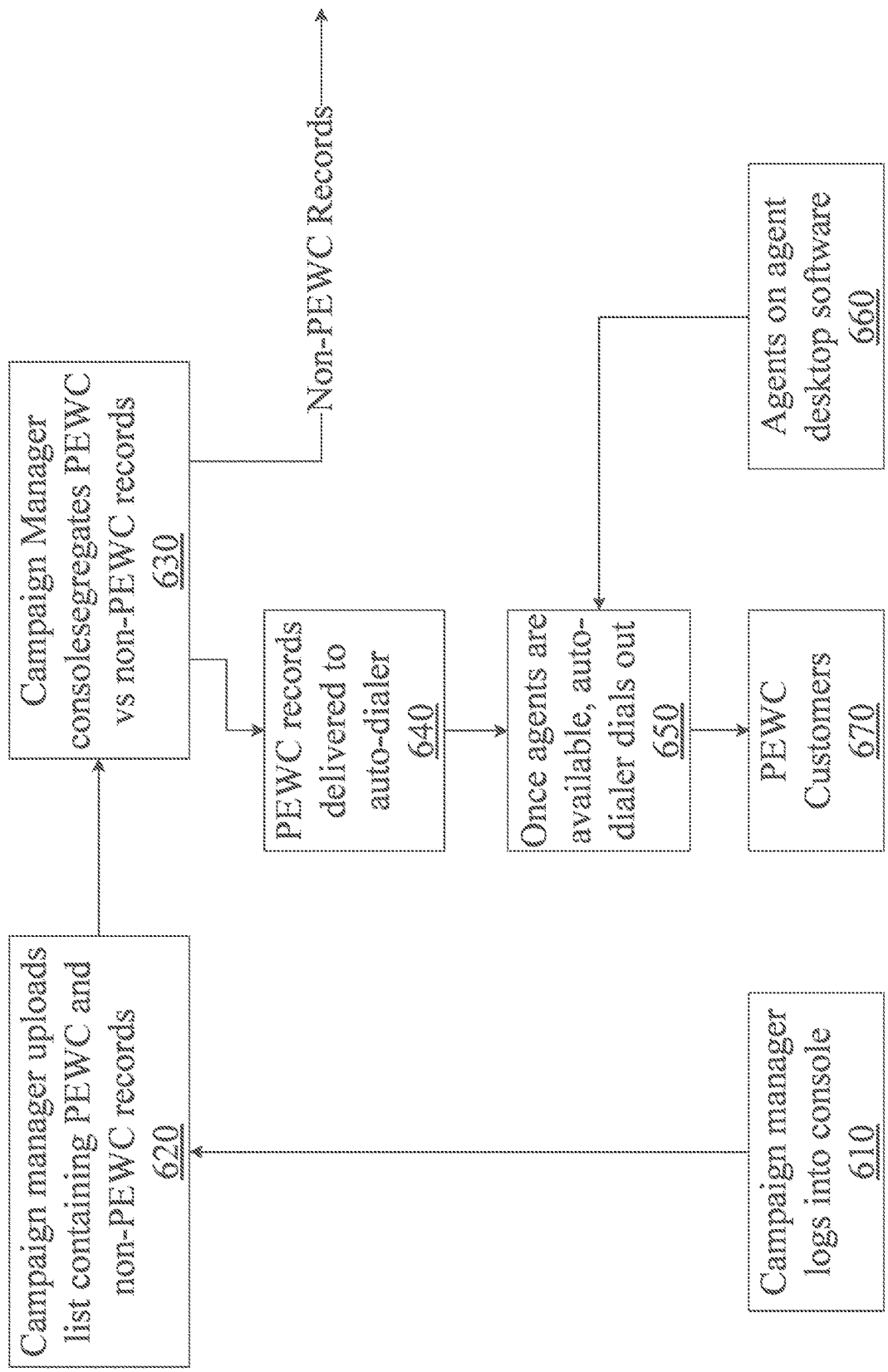

FIG. 6 is a directional method diagram similar to a flowchart, illustrating steps taken by a system for unified autodial campaign management, according to one embodiment.

Figure 7:
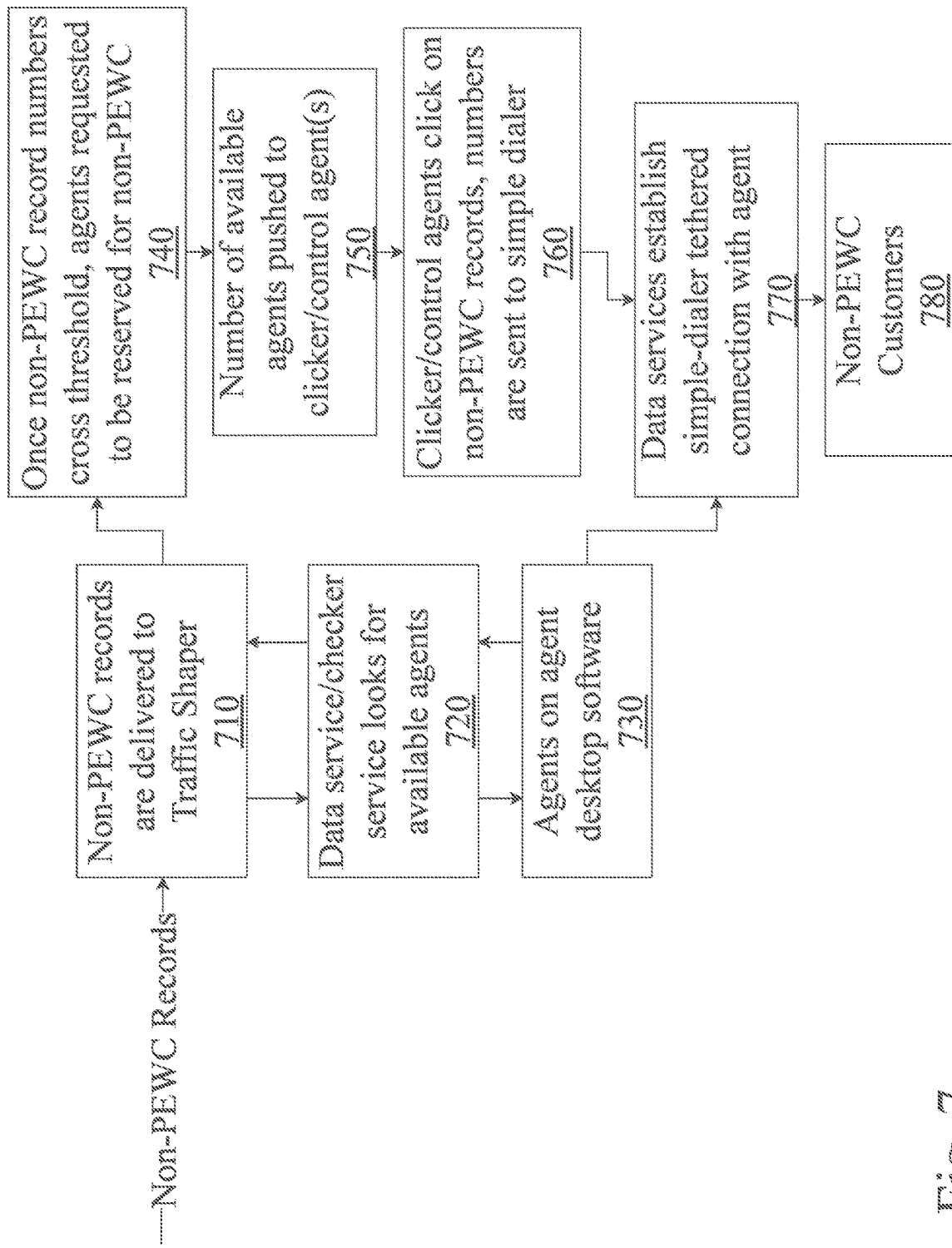

FIG. 7 is a second half of a directional method diagram similar to a flowchart, illustrating steps taken by a system for unified autodial campaign management, according to one embodiment.

Figure 8:
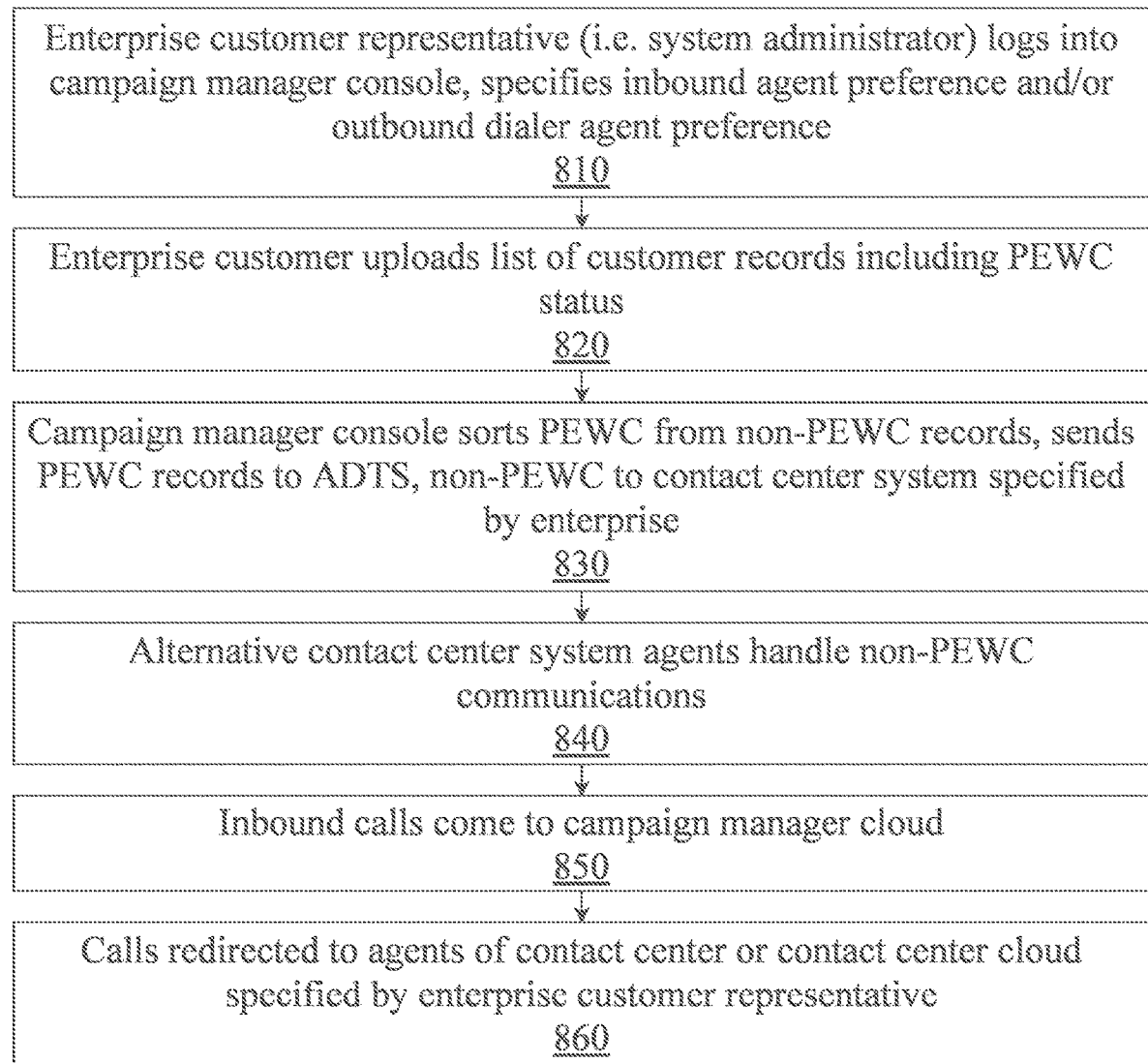

FIG. 8 is a method diagram illustrating an enterprise representative operating a campaign manager console to centrally manage a unified autodial campaign, according to an aspect.

Figure 9:
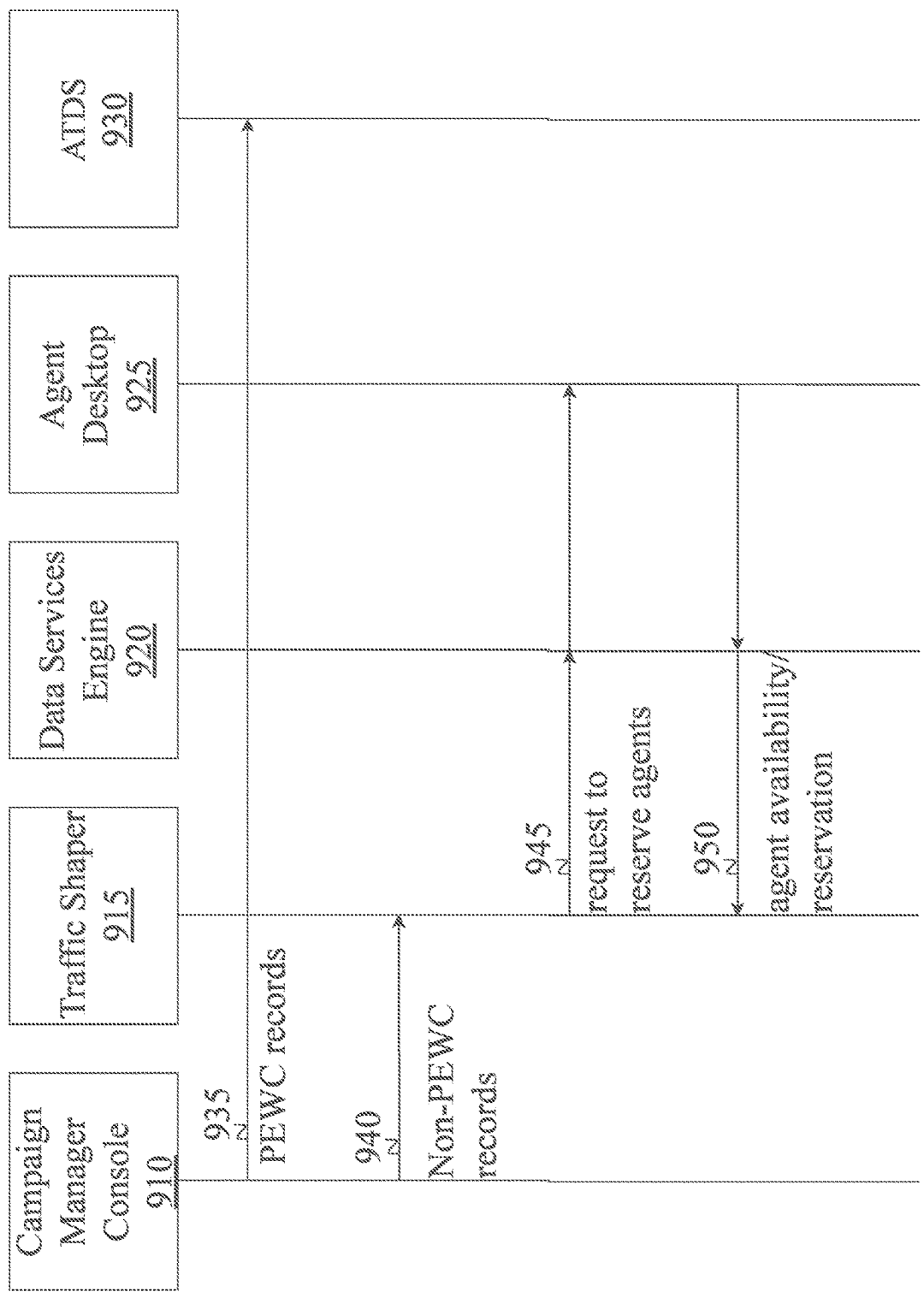

FIG. 9 is a message flow diagram illustrating steps taken by a system for unified autodial campaign management, according to one embodiment, illustrating steps for the processing of customer record lists, segregation of such a list based on PEWC status, and dealing with the segregated records.

Figure 10:
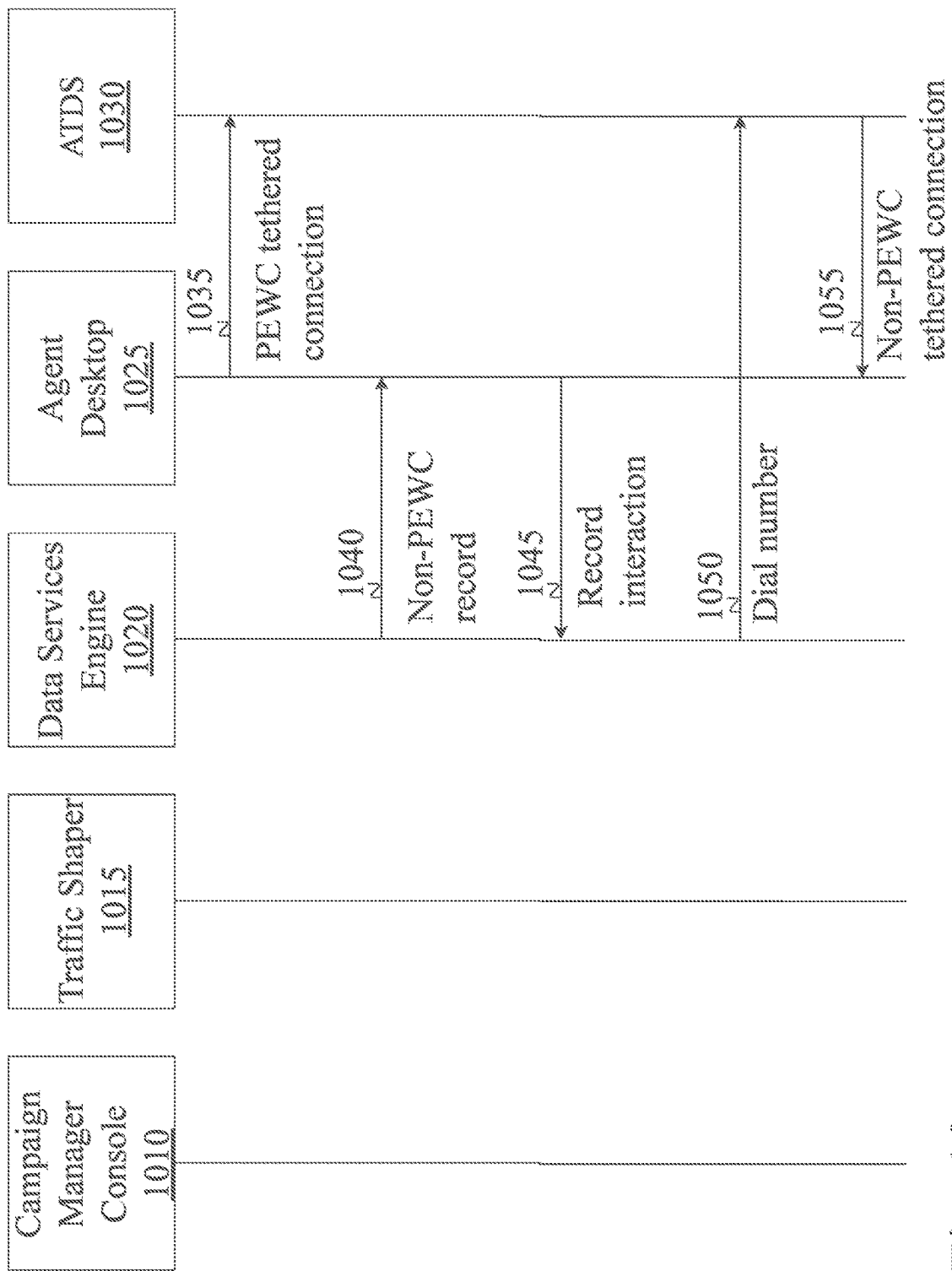

FIG. 10 is a message flow diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents.

Figure 11:
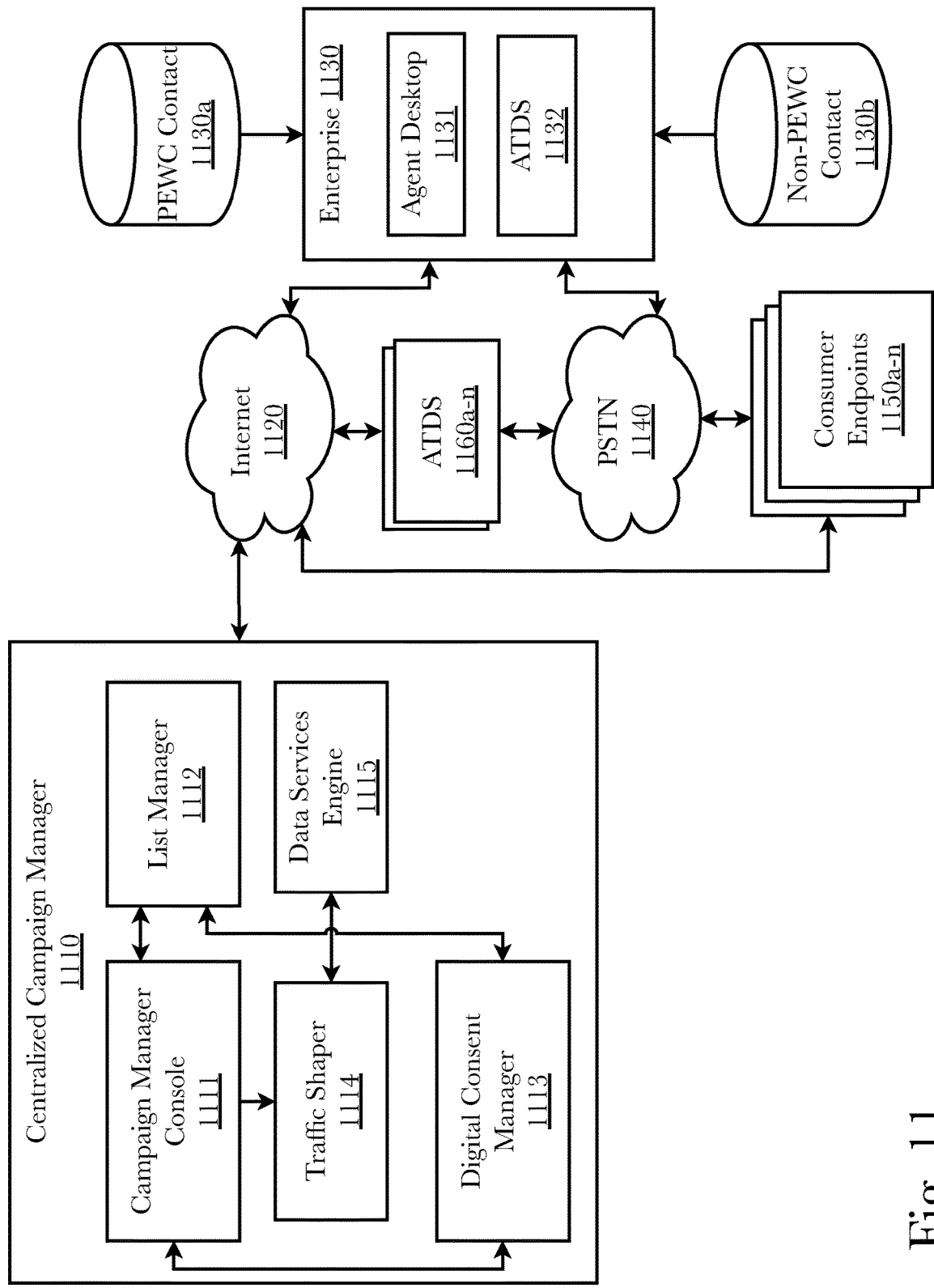

FIG. 11 is a block diagram illustrating an exemplary architecture for an advanced consent management system utilizing multiple outbound channels, according to an embodiment.

Figure 12:
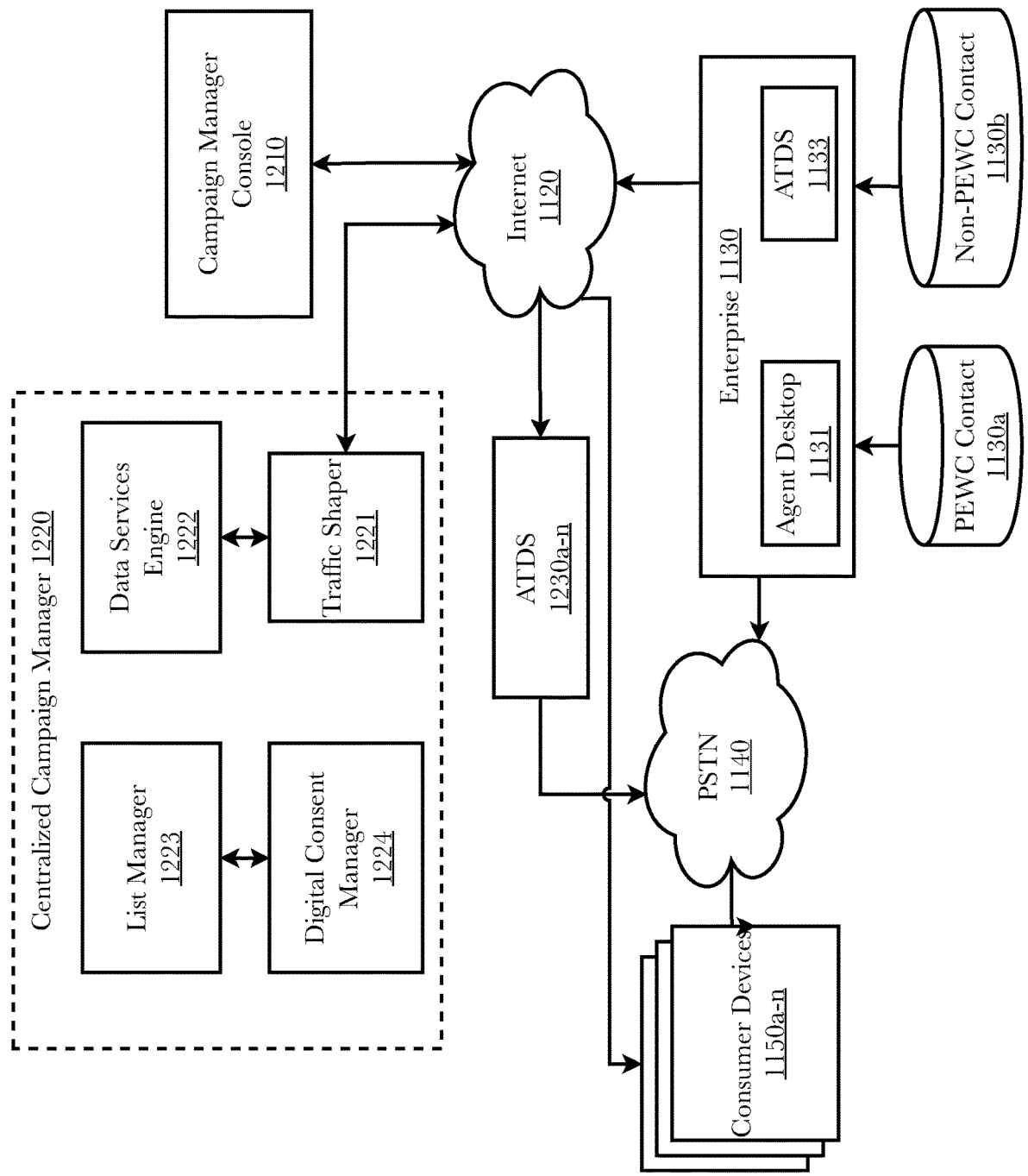

FIG. 12 is a block diagram illustrating an exemplary system architecture for advanced consent management system utilizing multiple outbound channels, according to one embodiment, showing a plurality of connected systems that may operate separately or in different cloud architectures.

Figure 13:
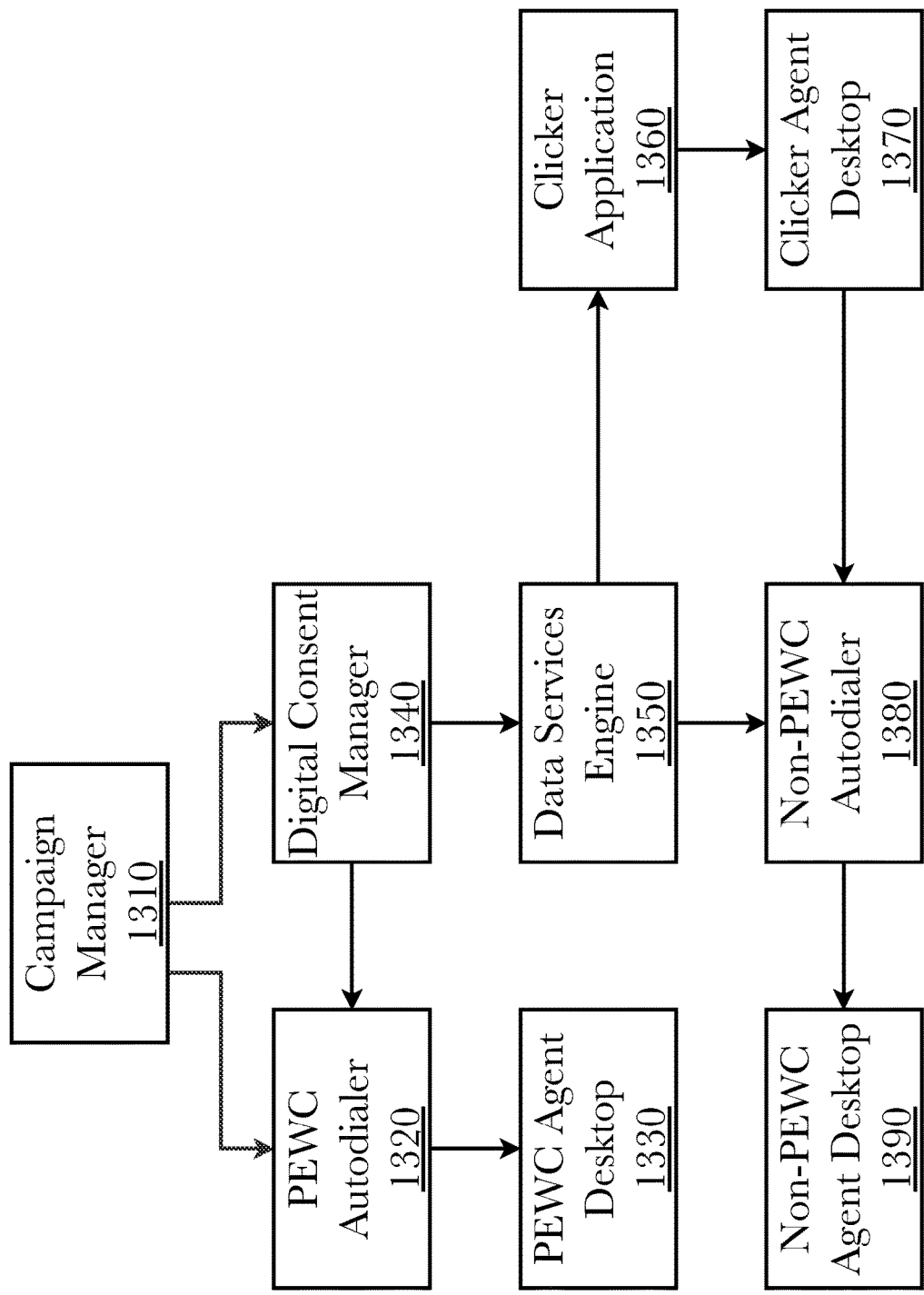

FIG. 13 is a block diagram illustrating an exemplary system architecture for advanced consent management system utilizing multiple outbound channels, according to one embodiment, showing a plurality of connected systems that may operate separately or in different cloud architectures, governed by or receiving input data from a single campaign manager service or console.

Figure 14:
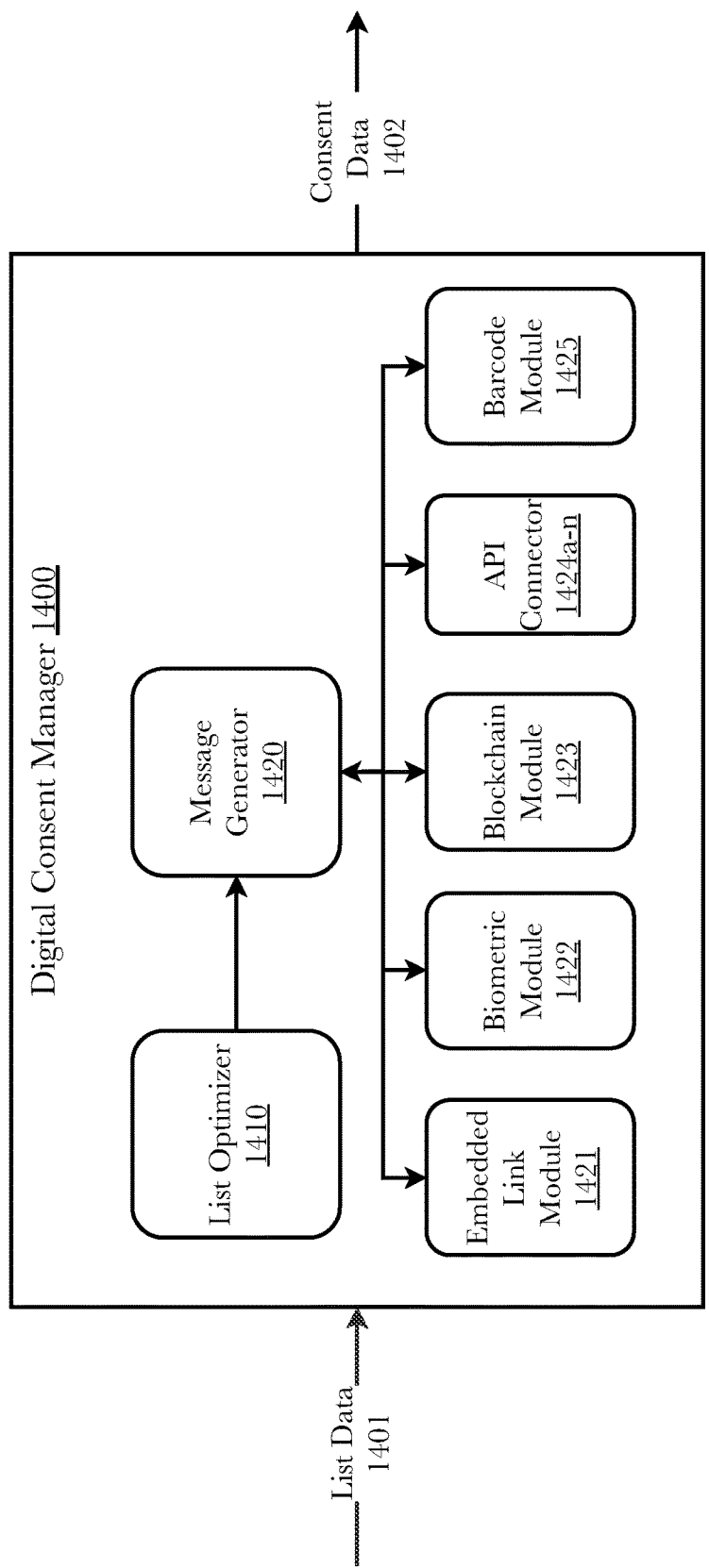

FIG. 14 is a block diagram illustrating an exemplary aspect of the advanced consent management system utilizing multiple outbound channels, a digital consent manager.

Figure 15:
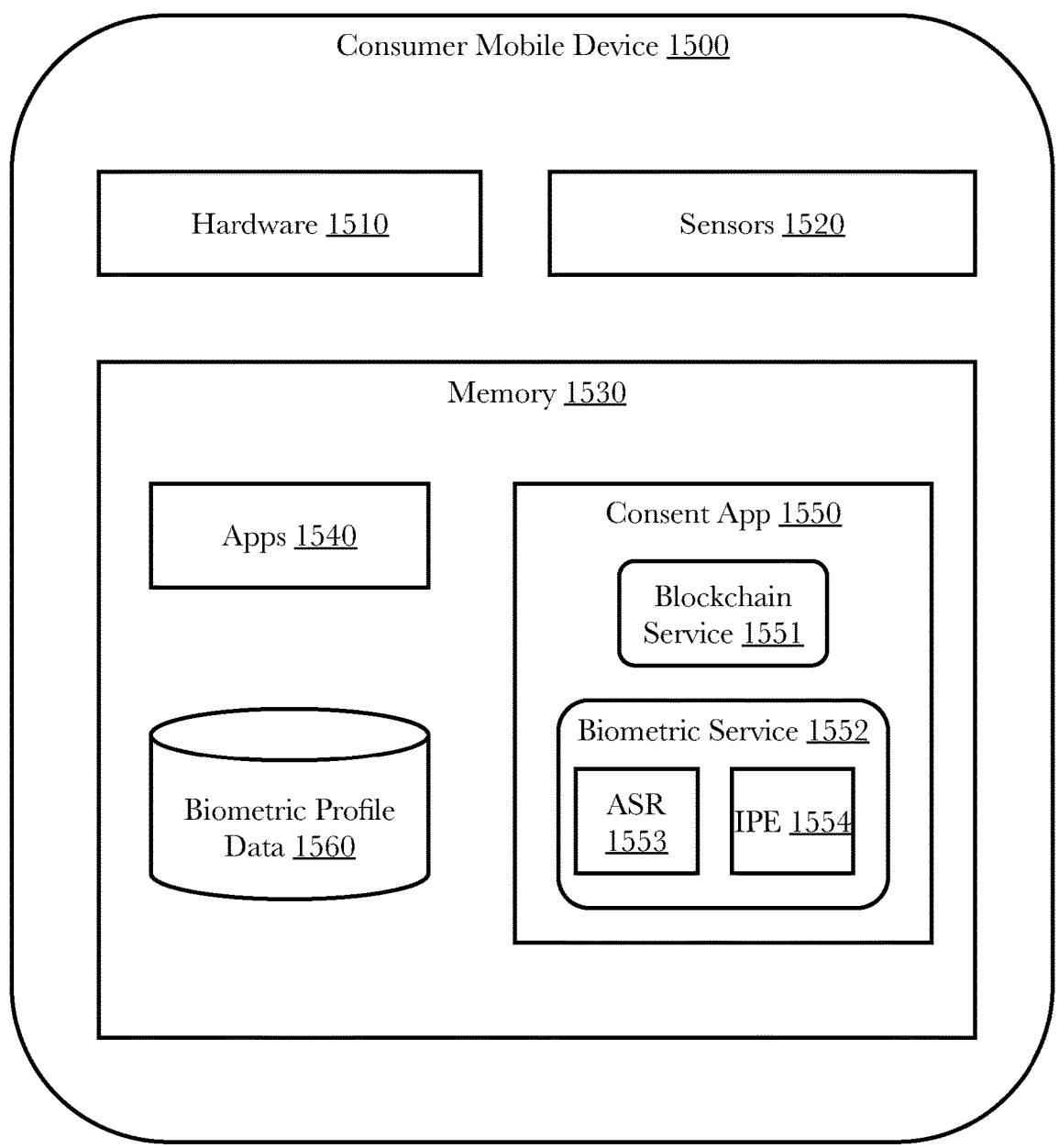

FIG. 15 is a block diagram illustrating an exemplary consumer mobile device operating a consent software application (consent app) which is configured to connect with centralized campaign manager in order for a user of the mobile device to provide consent for calls, according to an embodiment.

Figure 16:
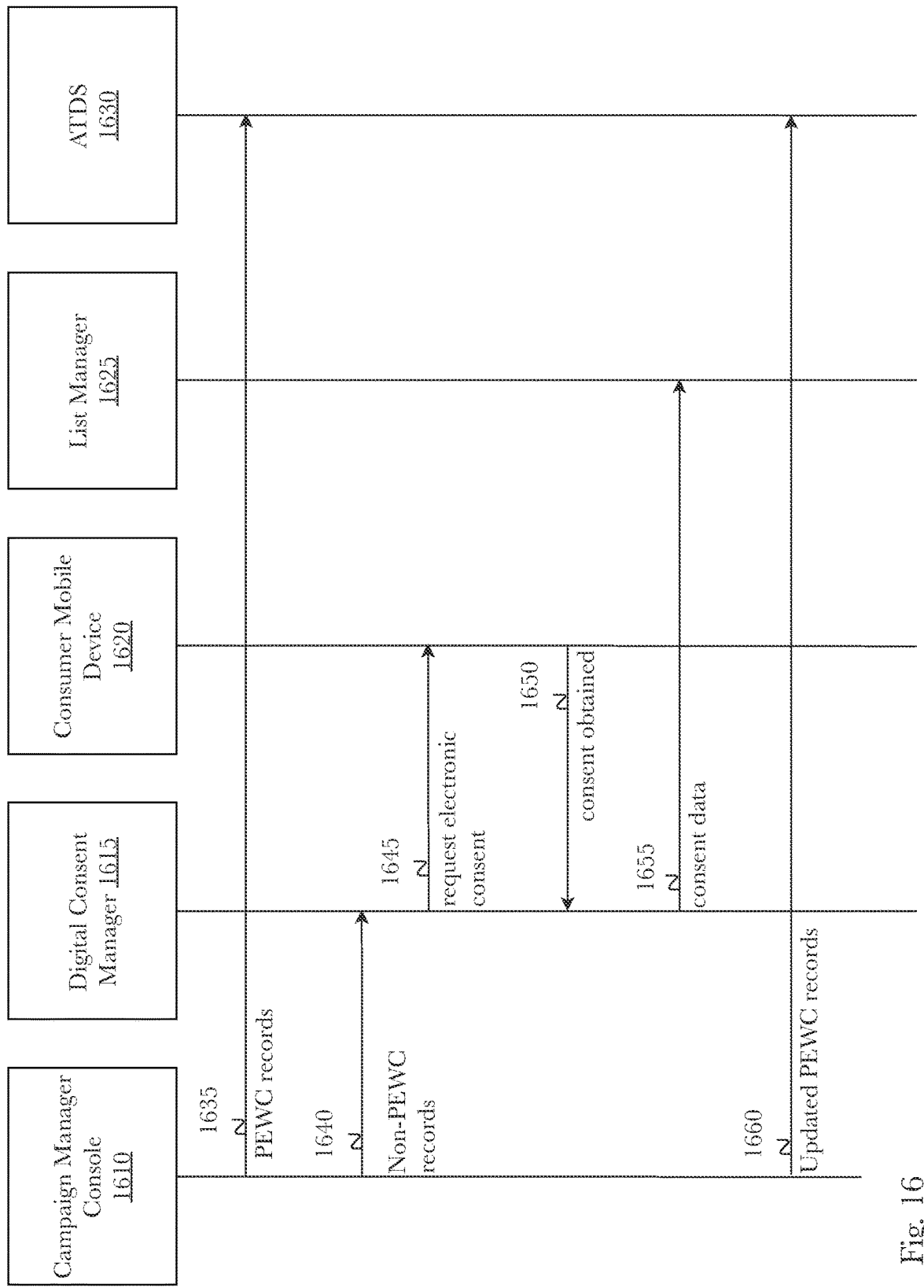

FIG. 16 is a message flow diagram illustrating steps taken by a system for advanced consent management, according to one embodiment, illustrating steps for the processing of customer record lists, segregation of such a list based on PEWC status, and dealing with the segregated records.

Figure 17:
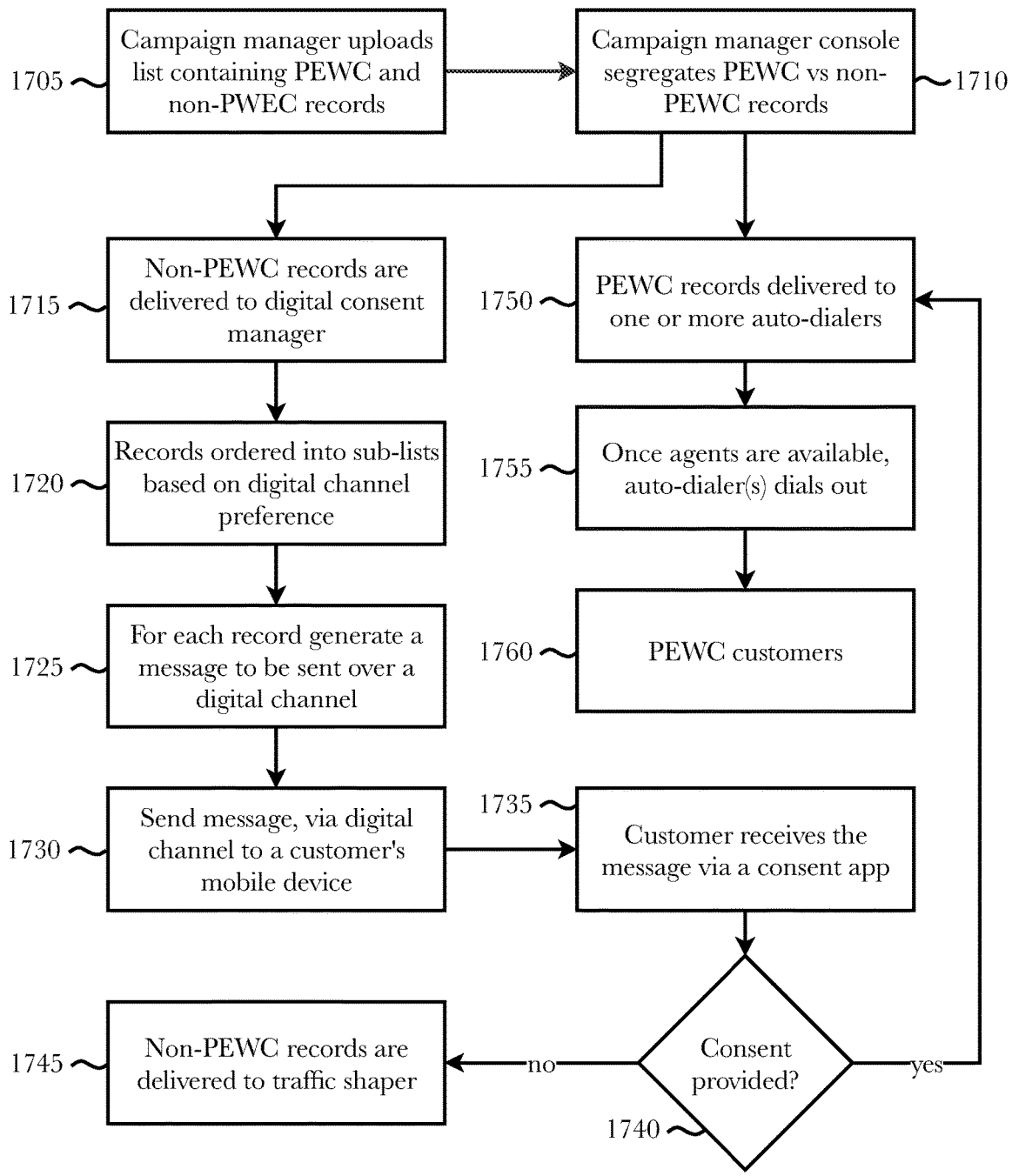

FIG. 17 is a flow diagram illustrating an exemplary method for advanced consent management for outbound calling campaigns utilizing digital channels and auto-dialers, according to an aspect.

Figure 18:
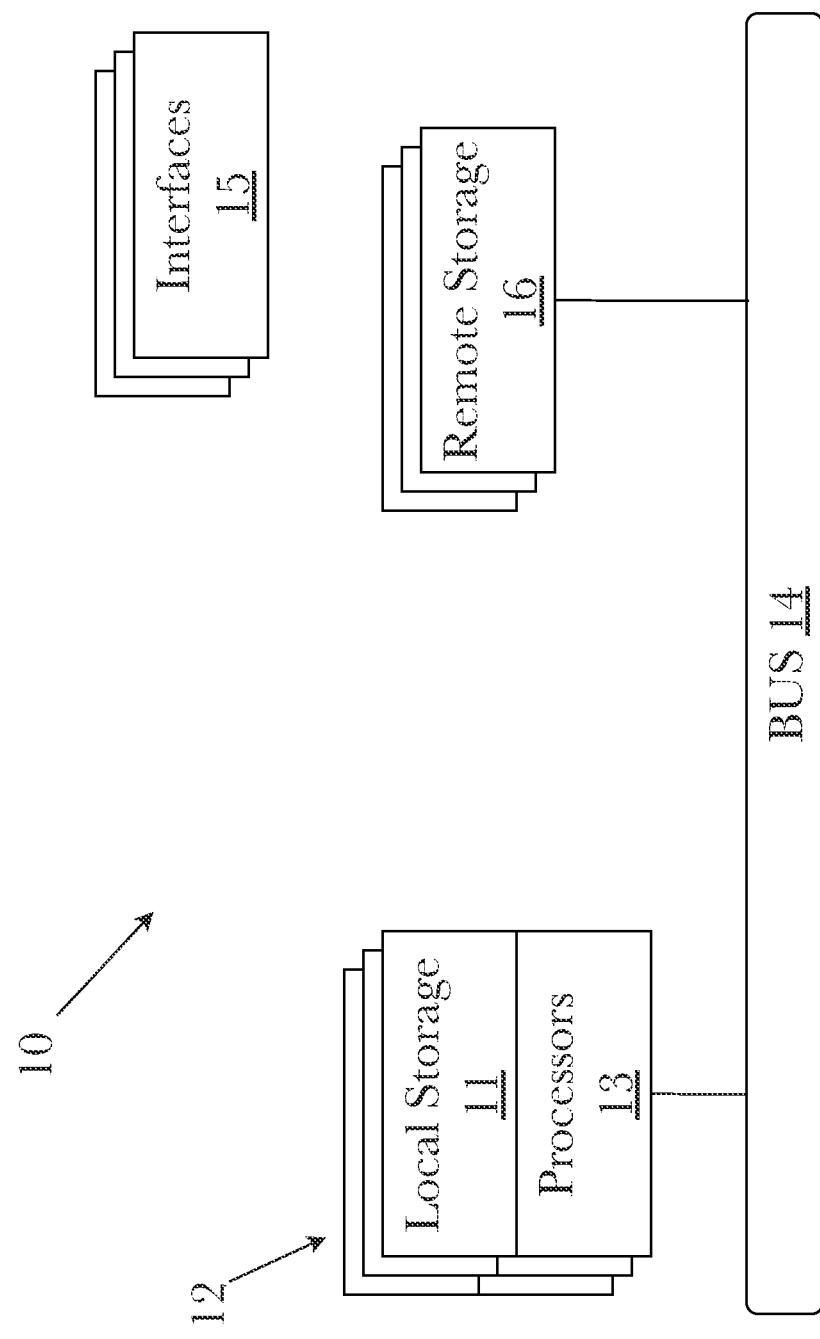

FIG. 18 is a block diagram illustrating an exemplary hardware architecture of a computing device.

Figure 19:
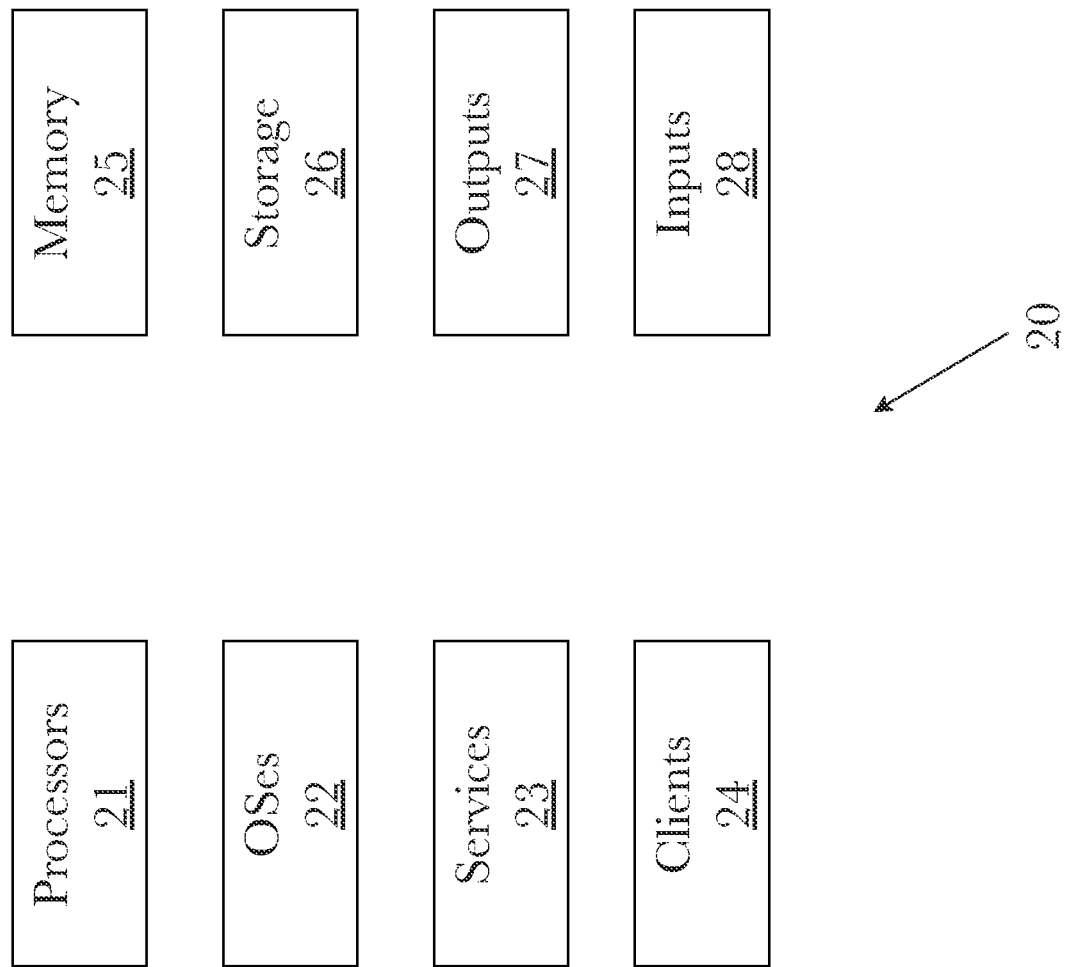

FIG. 19 is a block diagram illustrating an exemplary logical architecture for a client device.

Figure 20:
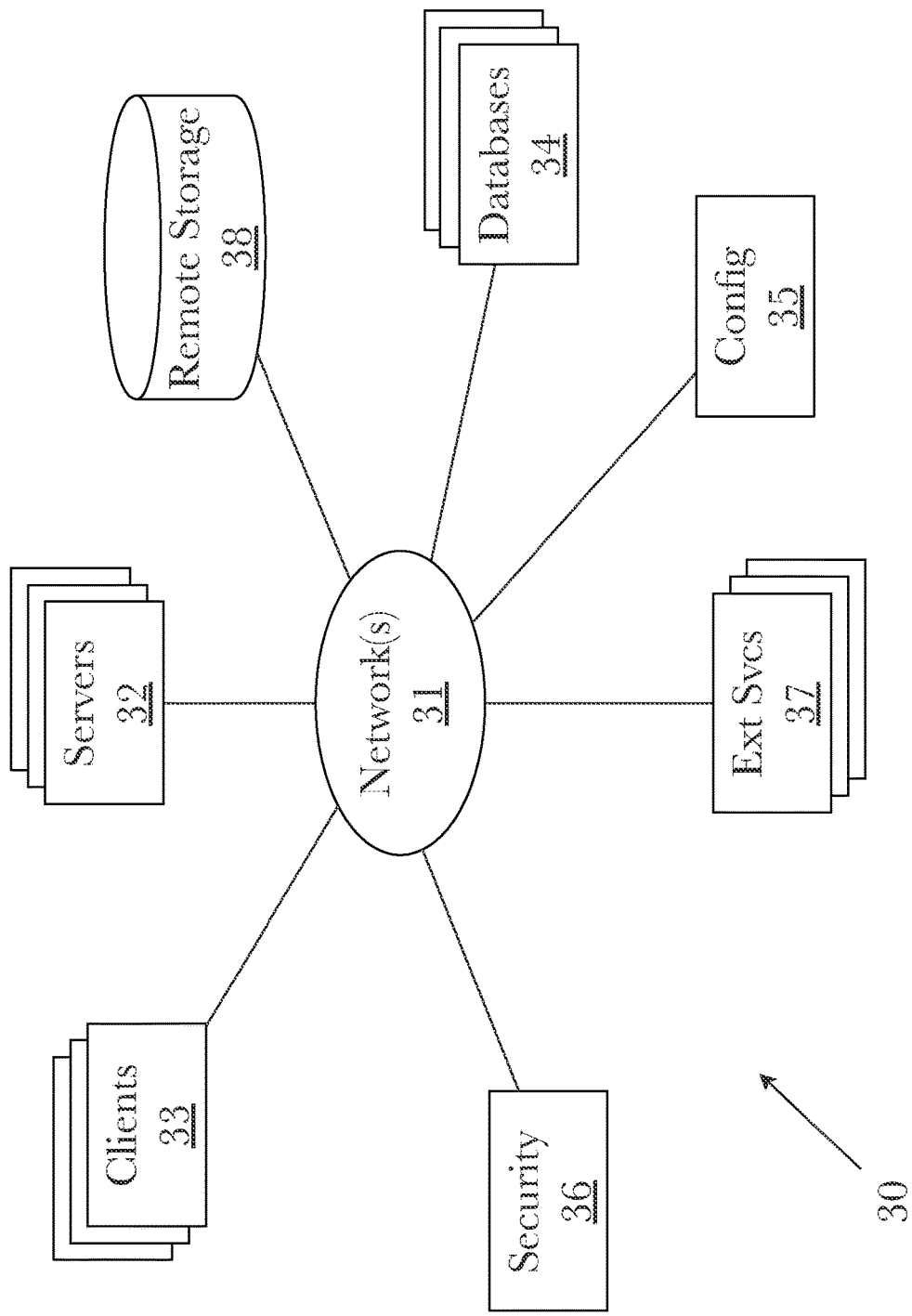

FIG. 20 is a block diagram showing an exemplary architectural arrangement of clients, servers, and external services.

DETAILED DESCRIPTION

The inventor has conceived, and reduced to practice, a system and method for centralized multichannel campaign management using digital consent acquisition, comprising: a campaign manager console, configured to allow an enterprise, such as a contact center, to create, configure, monitor, and deploy outbound call campaigns; a list manager configured to store, retrieve, create, and transform lists of numbers which can be used in the call campaign; a digital consent manager configured integrate with a plurality of digital channels in order to transmit to and receive messages from a consumer device in order to obtain consumer consent for a telephone call prior to a call being made by one or more auto-dialer systems; and a consumer device comprising a software application configured to connect with the digital consent manager via one or more integrated digital channels to so that the user of the consumer device can provide consent for a call to be received.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Artificial intelligence" or "AI" as used herein means a computer system or component that has been programmed in such a way that it mimics some aspect or aspects of cognitive functions that humans associate with human intelligence, such as learning, problem solving, and decision-making. Examples of current AI technologies include understanding human speech, competing successfully in strategic games such as chess and Go, autonomous operation of vehicles, complex simulations, and interpretation of complex data such as images and video.

"Machine learning" as used herein is an aspect of artificial intelligence in which the computer system or component can modify its behavior or understanding without being explicitly programmed to do so. Machine learning algorithms develop models of behavior or understanding based on information fed to them as training sets, and can modify those models based on new incoming information. An example of a machine learning algorithm is AlphaGo, the first computer program to defeat a human world champion in the game of Go. AlphaGo was not explicitly programmed to play Go. It was fed millions of games of Go, and developed its own model of the game and strategies of play.

"Neural network" as used herein means a computational model, architecture, or system made up of a number of simple, highly interconnected processing elements which process information by their dynamic state response to external inputs, and is thus able to "learn" information by recognizing patterns or trends. Neural networks, also sometimes known as "artificial neural networks" are based on our understanding of the structure and functions of biological neural networks, such as the brains of mammals. A neural network is a framework for application of machine learning algorithms.

"Simple dialer" or "accelerated dialer" as used herein means a software system that may complete the dialing of a phone number, on-request, when it is given the phone number for dialing, such as from manual human selection of the number. This is in contrast to an auto-dialer or automatic dialing system, which programmatically or automatically finds the numbers to dial and dials them without human interaction, which is restricted in some legal systems in certain situations.

Conceptual Architecture

Figure 1:
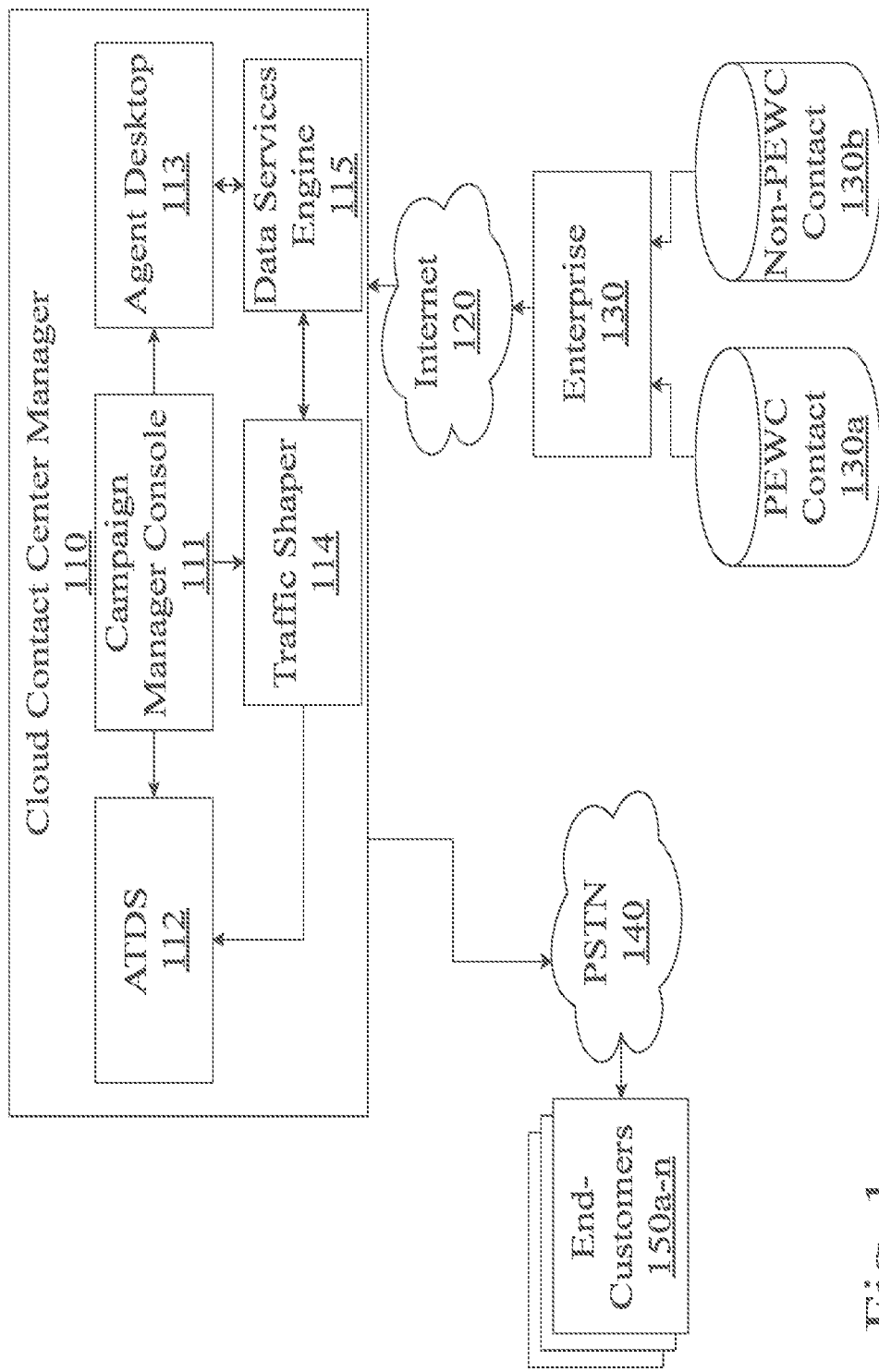
FIG. 1 is a block diagram illustrating an exemplary system architecture for unified autodial campaign management, according to one embodiment, showing a singular cloud architecture with numerous components to operate the system.

FIG. 1 is a block diagram illustrating an exemplary system architecture for unified autodial campaign management, according to one embodiment, showing a singular cloud architecture with numerous components to operate the system. Cloud contact center manager 110, which constitutes a cloud service managing several software and hardware components including a campaign manager console 111, an Automatic Telephone Dialing System ("ATDS") 112, agent desktop software 113, a traffic shaper 114 engine, and a data services engine 115. Such services may be accessed independently or through a campaign manager console 111, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet 120, and may use any of a variety of protocols including SSH, Telnet, TCP/IP, UDP, and others. The campaign manager console 111 or "CMC" may be configured to be a centrally access point for users and administrators to access other parts of a cloud contact center manager 110, such as an ATDS 112 or traffic shaper 114, and may provide functionality for an administrator to create and manage a customer contact and autodialing campaign, including campaign duration, scope, customer records to contact, agent distribution and reservation settings, and agent integration with the system. Agent desktop software 113 may take the form of software operating on a virtual or physical desktop managed by the cloud system 110 that an agent uses to set their own information such as availability and reservation status, and interact with received customer records, which may be received either directly from a CMC 111 or from data services 115 that determine which agents to send which records after a traffic shaper 114 determines how to organize the traffic from customer records to agents. A traffic shaper 114 may be a separate component to a CMC, or may be software that operates as part of the CMC 111, and determines based on the specifications of the campaign from the CMC 111 when enough customer records of PEWC or non-PEWC status are available to start reserving and interacting with agents, and sends the records to a data services engine 115, potentially with data about which agents or section of agents may be preferred for which customer records or sections of customer records. Alternatively, the data services engine 115 may make this determination about which agents are relegated to which customer records. An administrator may be a member or representative of an enterprise 130, an enterprise being a user of the cloud contact center manager 110 to operate a customer contact campaign using the CMC 111 over a network such as the Internet 120. The enterprise 130 must upload in some format, a list of customer records, comprising either or both of PEWC and non-PEWC customer records 130a, 130b, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The cloud contact center manager 110 may use, at some point during its operation, an ATDS 112 and/or agent desktop 113 to dial out to customers 150a-n, using a Public Switched Telephone Network ("PSTN") 140, using methods described herein.

Figure 2:
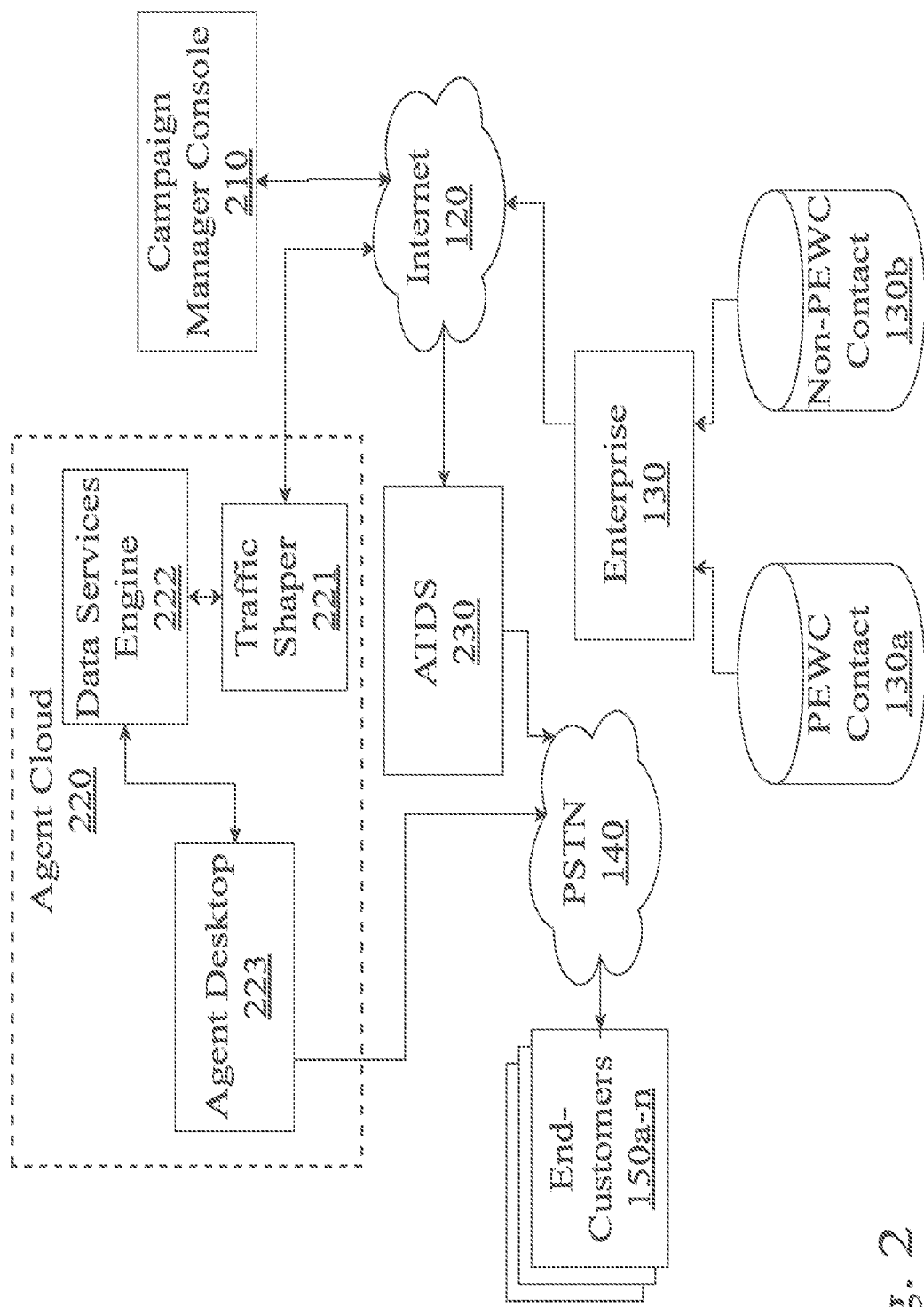
FIG. 2 is a block diagram illustrating an exemplary system architecture for unified autodial campaign management, according to one embodiment, showing a plurality of connected systems that may operate separately or in different cloud architectures.

FIG. 2 is a block diagram illustrating an exemplary system architecture for unified autodial campaign management, according to one embodiment, showing a plurality of connected systems that may operate separately or in different cloud architectures. Agent cloud 220, which constitutes a cloud service managing several software and hardware components including agent desktop software 223, a traffic shaper 221 engine, and a data services engine 222. Such services may be accessed independently or through the agent desktop software 223, or possibly through a console or user interface to manage the agent cloud 220 in alternative embodiments, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet 120, and may use any of a variety of protocols including SSH, Telnet, TCP/IP, UDP, and others. A campaign manager console 210 or "CMC" may be configured to be a central access point for users and administrators to access or manage parts of an agent cloud 220 or other services, such as an ATDS 230, and may provide functionality for an administrator to create and manage a customer contact and autodialing campaign, including campaign duration, scope, customer records to contact, agent distribution and reservation settings, and agent integration with the system. Agent desktop software 223 may take the form of software operating on a virtual or physical desktop managed by the cloud system 220 that an agent uses to set their own information such as availability and reservation status, and interact with received customer records, which may be received either directly from a CMC 210 or from data services 222 that determine which agents to send which records after a traffic shaper 221 determines how to organize the traffic from customer records to agents. A traffic shaper 221 may be a separate component to an agent cloud, or may be software that operates as part of the data services engine 222, and determines based on the specifications of the campaign from the CMC 210 when enough customer records of PEWC or non-PEWC status are available to start reserving and interacting with agents, and sends the records to a data services engine 222, potentially with data about which agents or section of agents may be preferred for which customer records or sections of customer records. Alternatively, the data services engine 222 may make this determination about which agents are relegated to which customer records. An administrator may be a member or representative of an enterprise 130, an enterprise being a user of the agent cloud 220 and CMC 210 to operate a customer contact campaign using the CMC 210 over a network such as the Internet 120. The enterprise 130 must upload in some format, a list of customer records, comprising either or both of PEWC and non-PEWC customer records 130a, 130b, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The agent cloud 220 may communicate with, over a network such as the Internet 120, at some point during its operation, an ATDS 230 and agent desktop 223 to dial out to customers 150a-n, using a Public Switched Telephone Network ("PSTN") 140, using methods described herein.

According to an embodiment, this system configuration allows for a third party agent cloud or a separately organized and configured agent cloud to be utilized, following a similar design pattern to a software engineering concept called "separation of concerns" in which logical separation and abstraction between components is preferable to closely-tied and integrated ones, that way components may be swapped out more easily, in some cases allowing for a "plug-n-play" architecture with certain components or services.

Figure 3:
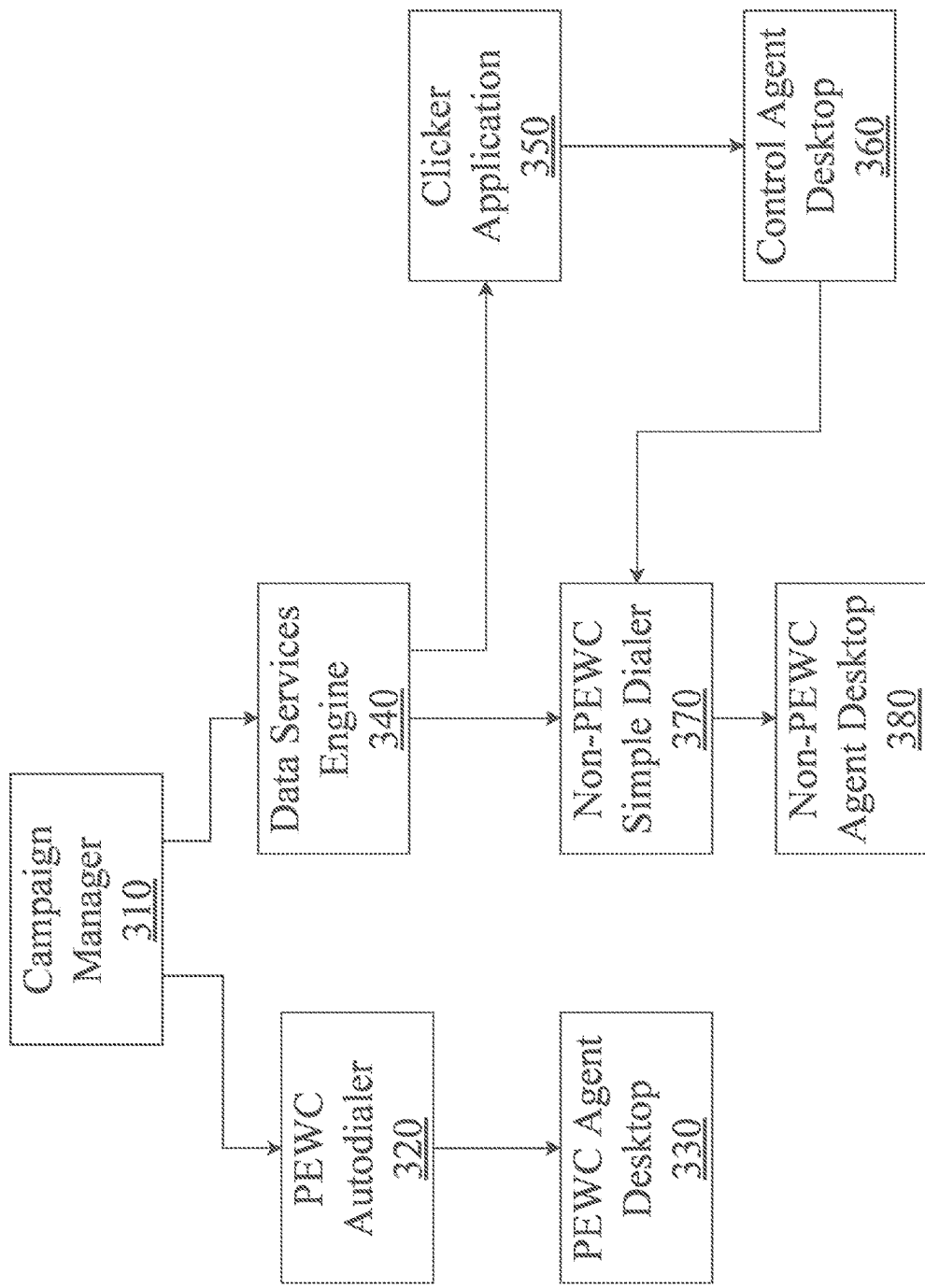
FIG. 3 is a block diagram illustrating an exemplary system architecture for unified autodial campaign management, according to one embodiment, showing a plurality of connected systems that may operate separately or in different cloud architectures, governed by or receiving input data from a single campaign manager service or console.

FIG. 3 is a block diagram illustrating an exemplary system architecture for unified autodial campaign management, according to one embodiment, showing a plurality of connected systems that may operate separately or in different cloud architectures, governed by or receiving input data from a single campaign manager service or console. According to a preferred embodiment, a campaign manager 310 is utilized to manage and arrange execution for a custom autodial campaign, using a data services engine 340 for non-PEWC customer records and a PEWC autodialer 320 is utilized for PEWC customer records. Such a campaign manager 310 may be a single software application or service, or multiple working in concert, over a network such as a Local Area Connection ("LAN") or a Wide Area Connection ("WAN") such as the Internet, and may use any of a variety of protocols including SSH, Telnet, TCP/IP, UDP, and others. The campaign manager 310 may be operated by an enterprise administrator or representative over a network or physically if it is hosted on a single computing device, to manage the entire campaign operation, with communication between components shown also being able to be accomplished either over a network or using inter-process communications, or even with certain components being part of the same computer process and merely listed separately to demonstrate logical separation but not physical separation between them. For PEWC customer records which are forwarded to a PEWC autodialer 320, the autodialer may dial the customers and establish a tethered connection to the customer with an agent using agent desktop software 330 that may be reserved by the autodialer itself 320 or by the campaign manager 310. For non-PEWC customer records which are forwarded to a data services engine 340, the records are made available to both a non-PEWC simple dialer 370 and a clicker application 350. The clicker application 350 works with control agent desktop software 360 that display, to specialized "control agents", non-PEWC customer records to click on using a graphical user interface, thereby informing the non-PEWC "simple dialer" 370 to dial that customer, therefore involving a human to start the dialing process, rather than a true automatic dialing. The dialed number is then tethered to an agent using non-PEWC agent desktop software 380, which may be different from the software for PEWC agents 330, or it may be the same software with the only difference being the manner in which the initial customer dialing takes place for the two branches.

FIG. 11 is a block diagram illustrating an exemplary architecture for an advanced consent management system utilizing multiple outbound channels, according to an embodiment. According to the embodiment, advanced consent management system 1100 comprises a centralized campaign manager (CCM) 1110 configured to connect with an enterprise 1130, such as a contact center, and a plurality of consumer endpoints 1150*a-n* via a communication network such as the Internet 1120. The system 1100 may further comprise a plurality of automatic telephone dialing systems (ATDS) which may be cloud-based ATDS 1160*a-n* or on-premise ATDS 1132 located at an enterprise 1130, for example a contact center's local auto-dialer system. Each of these ATDS 1160*a-n*, 1132 can connect with a public switched telephone network (PSTN) 1140 to perform automated dialing campaigns as managed by CCM 1110.

According to the embodiment, CCM 1110 is configured to autonomously manage outbound call campaigns for an enterprise 1130 utilizing multiple dialers 1160*a-n*, 1132 while performing advanced consent management by integrating with a plurality of digital channels configured to obtain consent from a customer prior to a telephone call being placed to the customer. This embodiment of CCM 1110 represents a "digital plus dialer" system which means obtaining consumer consent is initiated in a non-telephony channel, but the actual dialing for a outbound call campaign is conducted using a more conventional telephonic channel (e.g., PSTN, VoIP, etc.).

According to the embodiment, CCM 1110 may comprise a campaign manager console (CMC) 1111, a list manager 1112, a traffic shaper 1114, a data services engine 1115, and a digital consent manager 1113. CMC 1111 may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet 1120, and may use any of a variety of protocols including SSH, Telnet, TCP/IP, UDP, and others. Campaign manager console 1111 may be configured to be a central access point for users and administrators to access other parts of centralized campaign manager 1110, such as digital consent manager 1113 or traffic shaper 1114, and may provide functionality for an administrator to create and manage a customer contact and auto-dialing campaign, including campaign duration, digital channel selection, digital channel message selection, scope, customer records to contact, agent distribution and reservation settings, and agent integration with the system.

Agent desktop software 1131 may take the form of software operating on a virtual or physical desktop managed by CCM 1110 that an agent uses to set their own information such as availability and reservation status, and interact with received customer records, which may be received either directly from a CMC 1111 or from data services 1115 that determine which agents to send which records after a traffic shaper 1114 determines how to organize the traffic from customer records to agents. A traffic shaper 1114 may be a separate component to a CMC 1111, or may be software that operates as part of the CMC 1111, and determines based on the specifications of the campaign from the CMC 1111 when enough customer records of PEWC or non-PEWC status are available to start reserving and interacting with agents, and sends the records to a data services engine 1115, potentially with data about which agents or section of agents may be preferred for which customer records or sections of customer records. Alternatively, the data services engine 1115 may make this determination about which agents are relegated to which customer records. An administrator may be a member or representative of an enterprise 1130, an enterprise being a user of the centralized campaign manager 1110 to operate a customer contact campaign using the CMC 1111 over a network such as the Internet 1120. The enterprise 1130 must upload in some format, a list of customer records, comprising either or both of PEWC and non-PEWC customer records 1130*a*, 1130*b*, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. CCM 1110 may direct, at some point during its operation, one or more ATDS 1160*a-n*, 1132 and/or agent desktop 1131 to dial out to customers 1150*a-n*, using a PTSN 1140, using methods described herein.

According to an embodiment, a digital consent manager 1113 may be present as a component of centralized campaign manager 1110 and configured to store, manage, and obtain consumer consent by using one or more integrated digital channels and/or digital mechanisms. In some embodiments, the digital channel is facilitated using a software application (e.g., consent app 1550, see FIG. 15 below for more details) stored and operated on a consumer device 1150a-n, wherein the software application comprises services and mechanisms for interacting with CCM 1110 in order to provide consent via an electronic means. Consent data 1402 that is obtained via one or more digital channels may be sent to list manager 1112 which can update customer records with updated consent status, and store the updated consent records in a consent database, such as PEWC contact database 1130a. Furthermore, digital consent manager 1113 can be configured to obtain consumer consent for calls and then instruct an auto-dialer (e.g., ATDS 1160a-n, 1132) to place a telephone call to the number associated with consumer who provides consent via one or more digital channels.

According to the embodiment, list manager 1112 is configured to manage the formation, storage, retrieval, and maintenance of lists of customer records that are uploaded into campaigns. Lists may be uploaded by enterprise 1130. Lists may also be discovered and retrieved from $3^{rd}$ party sources such as from the National Do Not Call Registry list. According to an aspect, a list may comprise a plurality of records, wherein each record in a list is a number to be dialed along with parameters specific to that number. Examples of parameters can include, but are not limited to, a priority parameter which indicates in what order the stored number should be dialed, a time-to-call and/or time-not-to-call parameter, a consent status which indicates the current call consent status associated with the stored number, digital channel connections (e.g., existing and historical available digital consent channels, etc.), and account data associated with the stored number such as, for example, an account balance may be used to sort a collections campaign by grouping available numbers within a time slot by how much they owe. These, and other parameters, may be used by list manager 1112 or other CCM 1110 components in order to search, filter, group, or otherwise interact with records stored in a given list. Additionally, list manager 1112 may filter a list of records according to parameters specific to a calling campaign and then create a new list comprising the filtered records to be used in the calling campaign. For example, an enterprise 1130, such as a video streaming service, may choose to create a "consumer retention campaign" via CMC 1111 by indicating during campaign configuration that customers whose subscription to the video streaming service is set to expire in the next two months should be called, and list manager 1112 can use this two month campaign parameter to search through existing enterprise customer list to find account data which indicate their subscription expires within the next two months, filter out all customers who do not fit within the campaign parameter, and create a new list comprising only customers who's subscription is set to expire within the next two months. As another example, a sub-list may be filtered to comprise records that all have a specified time-to-call parameter which fall within a given time period (e.g., thirty minute time period, etc.). Any list may be created using this filtering method applied to any data field associated with the records in a list (e.g., create a list of numbers with same area code, create a list of numbers with PEWC status and list with Non-PEWC status, etc.).

According to the embodiment, list manager 1112 is configured to provide list management functions and features for outbound call campaigns. One such list management feature may be adding numbers to lists based upon need/opportunity detection. An event may happen within the software application stored and operating on the consumer device 11501a-n that causes the app to add the user of the consumer device to a campaign or to a particular list. For example, the app may provide a customer support portal and an event may be a customer creating a ticket with customer support via the portal on the app. In this case, when a customer creates a ticket the list manager 1112 can receive this information and add the customer's number to a campaign. In some embodiments, a mobile device user's response to a message received over a digital channel may be an event that list manager 1112 can recognize and respond to. Another example of a list management feature may be removing numbers from lists. For example, if customer or enterprise need has been fulfilled using a digital channel, then list manager 1112 can eliminate an unneeded call. As another example, a number may be removed from one list and added to another list (that may be associated with a different campaign) in order to convert it to an upsell call.

Another list management feature that may be present in centralized campaign manager system 1110 is the ability to change and update parameters associated with numbers and/or customer records in lists. For example, customer record parameters that indicate when an appropriate time to call or when not to call may be learned and/or changed in digital channels directly from the consumer and/or including from patterns of app usage. For example, if a customer is most active on the software application stored and operated on the customer's mobile device in the evening between 6 p.m. and 8 p.m., then list manager 1112 may be able to detect this usage pattern and adjust a call time parameter associated with the customer's record in the list. Another example of a type of parameter change that list manager can facilitate is adjusting prioritization of numbers in lists based on events in the digital channel. For example, some event on the app and/or within one of the digital channels causes the customer's propensity to churn to change substantially, which results in increasing (or decreasing) the prioritization number parameter. These are just a few simple examples of parameter adjustment that can be performed by list manager, and are not intended to be at all limiting in their scope or definition. Any existing parameter associated with a number in a list may be adjusted, if required, and adjustments may be based on events and activity in the digital channel and/or mobile device app, or from data otherwise implied, derived, or otherwise inferred from data related to the events and activity.

This digital plus dialer advanced consent management system can be configured to support multichannel outbound calling and interactions with a consumer or consumers. One particular use case may be when an enterprise agent has made a telephone call to a non-PEWC number, the customer can receive, while one the phone with the enterprise agent, a message via the customer's mobile device software application (e.g., consent app, referring to FIG. 15) and the customer can authenticate (e.g., provide consent) via the app or text message (or any other digital channel that can be established between CCM 1110 and the consumer device 1150a-n. The CCM 1110 can send a digital message via a digital channel that dictates what will be done on the audio channel (i.e., telephone call). Another exemplary use case of multichannel outbound calling and interactions is the use a multiple dialers to serve one campaign, and/or the use of multiple dialers to support one or more campaigns. The use of multiple dialers to server one campaign may include using a dialer configured to make calls to numbers associated with PEWC records, while a separate, specifically configured simple dialer is used to make calls to engage with non-PEWC records (as described in FIG. 13 below). In this use case, an outbound call campaign could be serviced by an enterprise 1130 and its dialers 1132 and by the enterprise's partners and their dialers 1160a-n, and could use various ATDS within one campaign.

FIG. 12 is a block diagram illustrating an exemplary system architecture for advanced consent management system utilizing multiple outbound channels, according to one embodiment, showing a plurality of connected systems that may operate separately or in different cloud architectures. Centralized campaign manager (CCM) 1220, which constitutes a cloud service managing several software and hardware components including list manager 1223, a digital consent manager 1224, a traffic shaper 1221 engine, and a data services engine 1222. Such services may be accessed independently or through the agent desktop software 1131, or possibly through a console or user interface to manage the centralized campaign manager 1220 in alternative embodiments, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet 1120, and may use any of a variety of protocols including SSH, Telnet, TCP/IP, UDP, and others. A campaign manager console 1210 or "CMC" may be configured to be a central access point for users and administrators to access or manage parts of CCM 1220 or other services, such as an ATDS 1230a-n, and may provide functionality for an administrator to create and manage a customer contact and autodialing campaign, including campaign duration, digital channel selection, digital channel message selection, scope, customer records to contact, agent distribution and reservation settings, and agent integration with the system. Agent desktop software 1131 may take the form of software operating on a virtual or physical desktop managed by CCM 1220 that an agent uses to set their own information such as availability and reservation status, and interact with received customer records, which may be received either directly from a CMC 1210 or from data services 1222 that determine which agents to send which records after a traffic shaper 1221 determines how to organize the traffic from customer records to agents. A traffic shaper 1221 may be a separate component to CCM 1220, or may be software that operates as part of the data services engine 1222, and determines based on the specifications of the campaign from the CMC 1210 when enough customer records of PEWC or non-PEWC status are available to start reserving and interacting with agents, and sends the records to a data services engine 1222, potentially with data about which agents or section of agents may be preferred for which customer records or sections of customer records. Alternatively, the data services engine 1222 may make this determination about which agents are relegated to which customer records. An administrator may be a member or representative of an enterprise 1130, an enterprise being a user of CCM 1220 and CMC 1210 to operate a customer contact campaign using the CMC 1210 over a network such as the Internet 1120. The enterprise 1130 must upload in some format, a list of customer records, comprising either or both of PEWC and non-PEWC customer records 1130a, 1130b, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The CMC 1220 may communicate with, over a network such as the Internet 1120, at some point during its operation, one or more ATDS 1230a-n and agent desktop 1131 to dial out to customers 1150a-n, using a Public Switched Telephone Network ("PSTN") 1140, using methods described herein.

According to an embodiment, list manager 1223 is configured to manage the formation, storage, retrieval, and maintenance of lists of customer records that are uploaded into campaigns. Lists may be uploaded by enterprise 1130. Lists may also be discovered and retrieved from $3^{rd}$ party sources such as from the National Do Not Call Registry list. According to an aspect, a list may comprise a plurality of records, wherein each record in a list is a number to be dialed along with parameters specific to that number. Examples of parameters can include, but are not limited to, a priority parameter which indicates in what order the stored number should be dialed, a time-to-call and/or time-not-to-call parameter, a consent status which indicates the current call consent status associated with the stored number, digital channel connections (e.g., existing and historical available digital consent channels, etc.), and account data associated with the stored number such as, for example, an account balance may be used to sort a collections campaign by grouping available numbers within a time slot by how much they owe. These, and other parameters, may be used by list manager 1223 or other CCM 1220 components in order to search, filter, group, or otherwise interact with records stored in a given list. Additionally, list manager 1223 may filter a list of records according to parameters specific to a calling campaign and then create a new list comprising the filtered records to be used in the calling campaign. For example, an enterprise 1130, such as a video streaming service, may choose to create a "consumer retention campaign" via CMC 1210 by indicating during campaign configuration that customers whose subscription to the video streaming service is set to expire in the next two months should be called, and list manager 1223 can use this two month campaign parameter to search through existing enterprise customer list to find account data which indicate their subscription expires within the next two months, filter out all customers who do not fit within the campaign parameter, and create a new list comprising only customers who's subscription is set to expire within the next two months. As another example, a sub-list may be filtered to comprise records that all have a specified time-to-call parameter which fall within a given time period (e.g., thirty minute time period, etc.). Any list may be created using this filtering method applied to any data field associated with the records in a list (e.g., create a list of numbers with same area code, create a list of numbers with PEWC status and list with Non-PEWC status, etc.).

According to the embodiment, list manager 1223 is configured to provide list management functions and features for outbound call campaigns. One such list management feature may be adding numbers to lists based upon need/opportunity detection. An event may happen within the software application stored and operating on the consumer device 1150 1a-n that causes the app to add the user of the consumer device to a campaign or to a particular list. For example, the app may provide a customer support portal and an event may be a customer creating a ticket with customer support via the portal on the app. In this case, when a customer creates a ticket the list manager 1223 can receive this information and add the customer's number to a campaign. In some embodiments, a mobile device user's response to a message received over a digital channel may be an event that list manager 1223 can recognize and respond to. Another example of a list management feature may be removing numbers from lists. For example, if customer or enterprise need has been fulfilled using a digital channel, then list manager 1223 can eliminate an unneeded call. As another example, a number may be removed from one list and added to another list (that may be associated with a different campaign) in order to convert it to an upsell call.

According to an embodiment, a digital consent manager 1224 may be present as a component of centralized campaign manager 1220 and configured to store, manage, and obtain consumer consent by using one or more integrated digital channels and/or digital mechanisms. In some embodiments, the digital channel is facilitated using a software application stored and operated on a consumer device 1150*a-n*, wherein the software application comprises services and mechanisms for interacting with CCM 1220 in order to provide consent via an electronic means. Consent data that is obtained via one or more digital channels may be sent to list manager 1223 which can update customer records with updated consent status, and store the updated consent records in a consent database, such as PEWC contact database 1130*a*. Furthermore, digital consent manager 1224 can be configured to obtain consumer consent for calls and then instruct an auto-dialer (e.g., ATDS 1230*a-n*, 1132) to place a telephone call to the number associated with consumer who provides consent via one or more digital channels.

According to an embodiment, this system configuration allows for a third party agent cloud or a separately organized and configured agent cloud to be utilized, following a similar design pattern to a software engineering concept called "separation of concerns" in which logical separation and abstraction between components is preferable to closely-tied and integrated ones, that way components may be swapped out more easily, in some cases allowing for a "plug-n-play" architecture with certain components or services.

FIG. 13 is a block diagram illustrating an exemplary system architecture for advanced consent management system utilizing multiple outbound channels, according to one embodiment, showing a plurality of connected systems that may operate separately or in different cloud architectures, governed by or receiving input data from a single campaign manager service or console. According to a preferred embodiment, a campaign manager 1310 is utilized to manage and arrange execution for a custom autodial campaign, using a data services engine 1340 for non-PEWC customer records and a PEWC auto-dialer 1320 is utilized for PEWC customer records. Such a campaign manager 1310 may be a single software application or service, or multiple working in concert, over a network such as a Local Area Connection ("LAN") or a Wide Area Connection ("WAN") such as the Internet, and may use any of a variety of protocols including SSH, Telnet, TCP/IP, UDP, and others. The campaign manager 1310 may be operated by an enterprise administrator or representative over a network or physically if it is hosted on a single computing device, to manage the entire campaign operation, with communication between components shown also being able to be accomplished either over a network or using inter-process communications, or even with certain components being part of the same computer process and merely listed separately to demonstrate logical separation but not physical separation between them. For PEWC customer records which are forwarded to a PEWC auto-dialer 1320, the auto-dialer may dial the customers and establish a tethered connection to the customer with an agent using agent desktop software 1330 that may be reserved by the auto-dialer itself 1320 or by the campaign manager 1310. Non-PEWC customer records may be sent to a digital consent manager 1340 which attempts to obtain customer consent via one or more digital channels such as, for example, via a software application stored and operated on a customer's mobile device. If customer consent is obtained via one or more digital channels, digital consent manager 1340 may pass the customer record to PEWC auto-dialer 1320 which can establish a tethered connection between a customer and a PEEWC agent desktop 1330, and can also send consent data to a list manager (not shown) which can update the data in a consent database such as, for example, PEWC contact 1130*a* database.

If digital consent manager 1340 does not obtain consent via one or more digital channels, the non-PEWC customer records are forwarded to a data services engine 1350, the records are made available to both a non-PEWC simple dialer 1380 and a clicker application 1360. The clicker application 1360 works with control agent desktop software 1370 that display, to specialized "control agents", non-PEWC customer records to click on using a graphical user interface, thereby informing the non-PEWC "simple dialer" 1380 to dial that customer, therefore involving a human to start the dialing process, rather than a true automatic dialing. The dialed number is then tethered to an agent using non-PEWC agent desktop software 1390, which may be different from the software for PEWC agents 1330, or it may be the same software with the only difference being the manner in which the initial customer dialing takes place for the two branches.

FIG. 14 is a block diagram illustrating an exemplary aspect of the advanced consent management system utilizing multiple outbound channels, a digital consent manager. According to an embodiment, a digital consent manager 1400 may be present as a component of centralized campaign manager 1110 and configured to store, manage, and obtain consumer consent by using one or more integrated digital channels and/or digital mechanisms. In some embodiments, the digital channel is facilitated using a software application stored and operated on a consumer device 1150*a-n*, wherein the software application comprises services and mechanisms for interacting with CCM 1110 in order to provide consent via an electronic means. Consent data 1402 that is obtained via one or more digital channels may be sent to list manager 1112 which can update customer records with updated consent status, and store the updated consent records in a consent database, such as PEWC contact database 1130*a*. Furthermore, digital consent manager 1400 can be configured to obtain consumer consent for calls and then instruct an auto-dialer (e.g., ATDS 1160*a-n*, 1132) to place a telephone call to the number associated with consumer who provides consent via one or more digital channels.

According to the embodiment, a list optimizer 1410 can be configured to receive list data 1401 and parse the list data in order to determine optimal sub-lists for obtaining consent via the one or more integrated digital channels. The list data 1401 may comprise a list of non-PEWC customer records wherein each record may or may not have an assigned digital channel connection parameter. For example, list data 1401 may comprise one or more records, wherein each record in a list is a number to be dialed along with parameters specific to that number, and list optimizer 1410 can parse the records to identify parameters which can be used to filter the list data 1401 into sub-lists such as, for example, a sub-list comprising records with parameters that indicate a preferred digital channel connection which is homogeneous for each record in the sub-list. By segregating the received list data 1401 into sub-lists, the digital consent manager 1400 is able to perform electronic consent acquisition across multiple digital channels in parallel, increasing the throughput and reducing the overall time required to initiate digital contact with each record in the received list data 1401. List data 1401 processed by list optimizer 1410 is sent to a message generator 1420.

According to the embodiment, the message generator 1420 is configured to receive a list or lists (e.g., one or more sub-lists) and to generate, for each record in the list, a message to be sent to a customer over one or more digital channels. In some embodiments, the message that is generated may be specific to a given digital channel, in other embodiments the message may be a general default message that is applied to all available digital channels. The generated message may be enterprise specific and selected, via CMC 1111, by a user or administrator during campaign configuration. Message generator 1420 may parse the data fields associated with each record in a received list to identify if a digital channel connection parameter has been indicated, and then generate the appropriate message for the indicated digital channel connection, if available. Once a message has been generated, it may be sent to the appropriate connector or module 1421-1425 which digital consent manager 1400 can use to establish a digital channel connection with a customer/consumer device in order to obtain customer consent to be called.

According to the embodiment, digital consent manager 1400 may expose and integrate with a plurality of Application Programing Interface (API) connectors 1424*a-n* in order to facilitate communication and data transfer between digital consent manager 1400 and a consumer device. A digital channel may be established between digital consent manager 1400 and a consumer mobile device via a software application stored and operated on the mobile device and configured to interact with CCM 1110 in order to receive requests for consumer consent via one or more electronic means. A digital channel may be a social media platform where an enterprise has an associated social media profile (e.g., account, page, link, blog, etc.) where enterprise customers and non-customers who have a social media profile can subscribe to the enterprise social media channel, and by subscribing to the enterprise profile the customers and non-customers provide consent to be called about information related to the enterprise and/or its products and services. For example, a video game company can create a social media fan page for a popular character in a video game the company created, and when fans and players of the game join the fan page on social media they give their consent to potentially receive calls about news, events, and information related to the video game and/or the video game company. In such a case, an API connector 1424*a-n* may be used to connect with the social media server, retrieve the consent data associated with the fan page subscriber list, and compare the names on the subscriber list to the names stored in the records associated with the received list or sub-list. Multiple API connectors 1424*a-n* may be used simultaneously, such as making multiple requests of a social media server, or one API connecting to a social media server, a second API connecting to a $3^{rd}$ party database, and a third API connecting to a mobile game server.

As another example of a digital channel that could be used to obtain customer consent via digital consent manager 1400 is in a video game setting using either a mobile game designed to be played on a mobile device or a conventional video game designed to be played on a console or personal computer. A video game player may give consent for calls to manage the payer's in-game purchasing account. Another way is a player gives consent for calls in order to unlock extra features or content within the game. No matter the method of obtaining consent via a digital channel such as a mobile game operating on a customer's mobile device, an API connector 1424*a-n* is used to connect to the backend server of the video game in order to retrieve the customer consent data.

As yet another example of a type of API connector 1424*a-n* that may be using by digital consent manager 1400 is an API to transmit and receive short message service (SMS) text messages with a consumer mobile device in order to obtain consumer consent for calls. A simple test message may be generated and sent as an SMS via an API to a mobile number associated with a customer record asking for consent for calls, and the customer can reply back either giving their consent or not giving their consent. A service such as, for example, TWILIO™ can be used to provide APIs for SMS digital communication channels. Other APIs that may be utilized by digital consent manager 1400 can include APIs associated with mobile device applications such as an email service and/or text messaging services.

According to the embodiment, a biometric module 1422 is configured to obtain consumer consent via biometric authentication as provided by a consumer device. Stored and operative on the consumer device may be a software application configured to integrate with a plurality of digital channels over which to receive messages from digital consent manager 1400, wherein the messages are sent to the consumer device to obtain consumer consent to be called. Biometric module 1422 is specifically configured to obtain consumer consent and/or authentication via consumer biometric data. Present on the consumer device may be a plurality of hardware and sensors such as a camera, microphone, thumbprint scanner, gyroscope, global positioning system sensor, and accelerometer to name a few. These sensors may capture and pass biometric data to various biometric support systems such as, for example, a voice recognition system which may be able to create and/or capture a consumer voice print from speech data received from the consumer device microphone. As another example a consumer device camera can capture image or video data which may be sent to a image processing engine which can be configured to extract unique facial features associated with the user of the consumer device from the image or video data and store those unique facial features in a biometric profile of the user. Consumer biometric data (e.g., biometric profile, voice print, unique facial features, etc.) stored on the consumer's mobile device may be compared against data gathered by the consumer device's onboard sensors in order to authenticate the consumer thereby providing consent for calls. As an example, consider a consumer receives a message, via the software application on their mobile device, which states "If you'd like to receive a call from Enterprise about something, please look at your device and authenticate yourself.", and then the consumer looks at his device and the software application compares the image data of the consumers face against stored consumer biometric data to authenticate the user. Upon successful consumer authentication, consent for a call is obtained. Biometric consent may be obtained on a per call basis, or may be used once to consent to all future calls from an enterprise during software application biometric authentication configuration and setup.

In some embodiments, customer biometric profiles may be securely stored in a database component of CCM 1110. In such an embodiment, biometric module 1422 can receive biometric data from and gathered by onboard sensors of consumer mobile device responsive to a message, received from biometric module 1422, which indicates the consumer consents to a call by providing biometric authentication data. The biometric data may be securely sent via the software application stored and operating on the consumer mobile device. Biometric module 1422 receives the biometric data and compares it against the stored biometric profiles to authenticate the consumer associated with the received biometric data, and a successful authentication indicates that the consumer has provided consent. In some aspects, customer biometric profiles may be stored both locally on a customer's mobile device and at CCM 1110.

According to the embodiment, a blockchain module 1423 is present and configured to obtain consumer consent for calls using blockchain technology as a digital channel. According to this embodiment, the software application stored and operated on the consumer mobile device may be configured to act as a node in a blockchain network, wherein the node is assigned to the user of the mobile device via a unique address. While seeking consent, it can be either generic for all campaigns managed and executed by digital consent manager 1400 or consent can be given for a specific campaign type. For example, a customer can provide permission to be contacted for a wealth management campaign but not for a home mortgage campaign. A customer response to a received message may provide an indication of consent and, in some implementations, one or more campaign types which the indication of consent may be applied to. Campaign types consented to may be stored as a parameter or preference in a customer record.

According to an aspect, digital consent manager 1400 may utilize smart contract technology to obtain consumer consent for calls. Blockchain module 1423 can create a smart contract between an enterprise 1130 and a consumer. The particular purpose of the smart contract may be related to the outbound call campaign as configured by a user or administrator via CMC 1111, for example if the outbound call campaign is for customer retention purposes, then a smart contract may be created specifically for the customer retention campaign. In other embodiments, an enterprise administrator can choose the purpose or purposes of the smart contract (e.g., to obtain consent for a particular call or calls related to one or more different purposes). The smart contract may be programmed so that when a consumer gives consent to the particular purpose described in the smart contract, the consumer number is added to a consent database (e.g., PEWC contact database 1130*a*), and the consumer number can be sent to an auto-dialer system which can dial the consumer number and then connect the consumer with an available enterprise agent 1131. In some implementations, consent database may comprise customer records and customer preferences and may be configured to be stored on a blockchain storage mechanism. For example, a customer's preferences (e.g., consent and campaign type to which consent is given) may be updated in a customer record responsive to receiving customer consent and campaign type data via a generated message sent to a customer mobile device, wherein each customer record is stored on an individual node (such as the node configured to operate on the customer's mobile device described above) on a blockchain within the blockchain network.

A created smart contract may be encrypted and stored in a blockchain network that may be stored on-premises at an enterprise, stored in a database associated with centralized campaign manager 1110, or some combination of the two. Once the contract is complete (i.e., consumer consent has been granted or denied), the transaction is recorded in the blockchain and all nodes will update their copy of the blockchain with this transaction, thereby updating the state of the blockchain network. This provides an enterprise and a consumer with an immutable record of expressed consumer consent, or the lack thereof, which can be used for auditing purposes, if necessary. Blockchain module 1423 may utilize hashing functions during smart contract creation in order to create unique keys and map them to other variables. For example, using a hashing function to create consent requests and map them to consumer records that provide consent. Each consumer has a software application stored and operating on their mobile device that can provide this smart contract functionality if the consumer decides to opt in to such a blockchain service. If a user does choose to opt in to the blockchain service then they will be assigned a unique address which represents that user on the blockchain network. This unique address can be stored in the customer record as one or more parameters that indicate the customer has opted into blockchain service and which indicate the customer's unique address on the blockchain network. The consumer's unique address and the enterprise's unique address are associated with the smart contract during creation. The consumer may receive a smart contract, or a notification of its creation, via the mobile device software application and then review and choose to provide consent or not to provide consent.

In some embodiments, by simply opting into the blockchain network via the mobile device software application, a consumer may automatically consent to receiving calls from the enterprise.

According to an aspect, blockchain module 1423 may utilize and/or integrate with decentralized application platforms such as Ethereum, Lisk, or Cardano in order to create smart contracts.

According to the embodiment, a barcode module 1425 is present and configured to obtain consumer consent for calls via a scannable barcode such as traditional barcodes or two-dimensional barcodes such as quick response (QR) codes. The barcode may be printed on an advertisement and read by a consumer mobile device. The reading of the barcode cause communication to be originated from the consumer's mobile device for the purpose of providing consumer consent to be contacted for a particular purpose. The sender's telephone number and other relevant information can be stored in a database used to ensure compliance with appropriate auto-dialing regulations. Additionally, the barcode may be electronically sent to a consumer mobile device, or displayed via webapp on a computer and subsequently read by the consumer mobile device. Likewise, in some embodiments, the activation of an embedded link (e.g., as a result of a barcode scan and redirect, as a component on a webapp, as a part of an email, etc.) may cause a communication to be sent to embedded link module 1421 and/or enterprise 1130. The communication may be a means for the customer who clicked on the embedded link to provide consent for communication, such as a voice call, to be initiated with the customer. For example, an email with an embedded link may be sent to a customer with instructions to click on an embedded link if the customer would like to receive telephone calls about a particular purpose. As another example, a customer may be interacting with a webpage associated with an enterprise, the webpage may comprise an embedded link that indicates interacting with the link causes the customer to provide consent to be contacted, via telephone call, by the enterprise.

If digital consent manager 1400 is successful in obtaining customer consent, then the acquired consent data 1402 may be sent to list manager 1112 which can use the consent data 1402 to update lists of customer records to reflect the change in consent status. Additionally, consent data 1402 (e.g., customer records with consent) can be sent to one or more auto-dialers 1160*a-n*, 1132 which can establish a tethered connection between an agent desktop 1131 and a consumer 1150*a-n*. If digital consent manager 1400 is unable to obtain customer consent, then the list data 1401 associated with non-consenting customer records (i.e., non-PEWC list) may be passed to CMC 1111 which can then pass this non-PEWC list to traffic shaper 1114. In some aspects, digital consent manager 1400 can send the non-PEWC list data directly to traffic shaper 1114 without having to route the list data through CMC 1111 first.

Detailed Description of Exemplary Aspects

Figure 4:
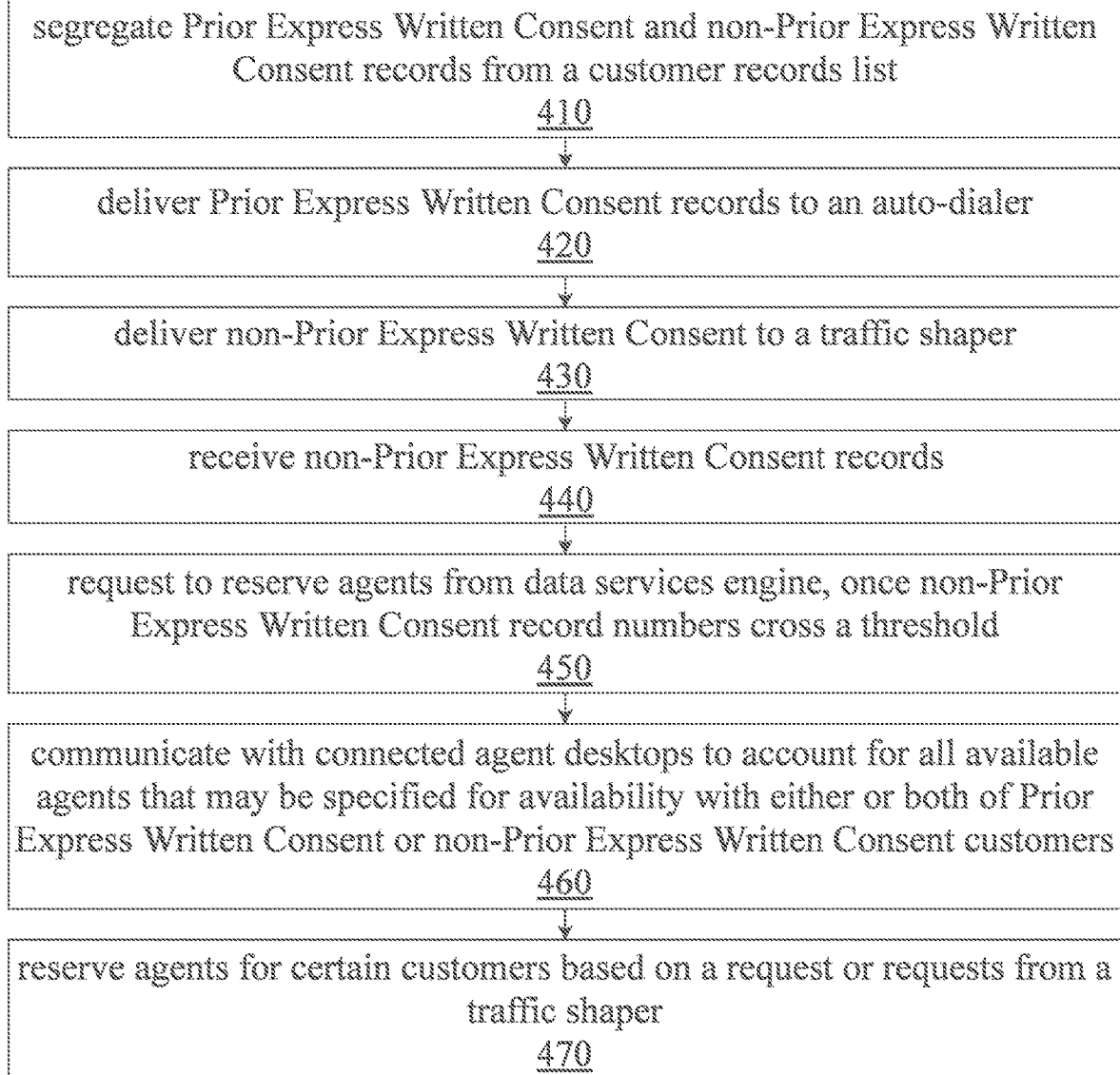
FIG. 4 is a method diagram illustrating steps taken by a system for unified autodial campaign management, according to one embodiment, illustrating steps for the processing of customer record lists, segregation of such a list based on PEWC status, and dealing with the segregated records.

FIG. 4 is a method diagram illustrating steps taken by a system for unified autodial campaign management, according to one embodiment, illustrating steps for the processing of customer record lists, segregation of such a list based on PEWC status, and dealing with the segregated records. First, after an enterprise provides a list or lists of customer records, if they are not already segregated based on PEWC Status, the system must segregate prior express written consent and non-prior express written consent records from a customer records list 410. For instance, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS 420 without any further processing. Non-PEWC records, however, may not be directly dialed by an ATDS under contemporary law in some legal codes and therefore they must be processed by agents rather than fully automatically dealt with. First the non-PEWC records are sent to a traffic shaper 430 which is a software application that may operate as part of the same system or a separate but connected system to the CMC, and may involve communication over a network such as a LAN or WAN. The traffic shaper receives the records 440, at which point it may make a request to reserve agents for the purpose of handling outbound non-PEWC customer communications, to a data services engine, once the number of non-prior express written consent records crosses a threshold 450. The threshold may be specified by an enterprise in the CMC for their specific campaign, or may be a configuration common to multiple enterprises and campaigns, or may be universal across all instances or uses of the CMC. The threshold may also be dynamic or programmatically defined, such as a certain percentage of the total number of records, or a number related to how many agents exist in the system to begin with. After that request is made, the data services engine may communicate with connected agent desktop software that is integrated into or otherwise connected to the cloud system, or listed in the data services engine configuration, to account for all available agents that may be specified for availability with either or both of prior express written consent or non-prior express written consent customers 460, to accurately determine the number of agents that can handle the customer records at hand. It may then reserve these agents for certain customers based on a request or requests from a traffic shaper 470, or reserve them merely for activity, meaning they cannot be scheduled for other activities until otherwise changed, but allow them to decide which customer to contact from a possible sub-list of customer records, such as if there are more customer records than agents.

FIG. 5 is a method diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents. A data services engine may facilitate a tethered connection between an agent desktop and an auto-dialer or simple dialer 510, such that the agent desktop software may be connected to an end customer's phone (whether cellular or not), the agent desktop being possibly hosted in the same cloud platform as the data services engine and a CMC, or possibly being hosted and operated by a separate cloud or third party contact center system. The data services engine may also allow contact center agents to establish agent availability 520, the data services engine and traffic shaper then determining which agents to reserve for PEWC or non-PEWC customer contacts, and reserve them for inbound or outbound communications, allowing the data services engine to determine which agents to send records to and tether connections to. In the process of determining which agents to tether to which customers, an agent desktop may display at least one customer number from at least one customer record delivered from a data services engine 530, such as on a computer monitor screen, to allow agents to interact with the at least one customer record 540 such as by clicking or otherwise selecting a customer record. When a customer record is selected, it may display other information about the customer, and may provide contextual menus or information to the agent, depending on the implementation. An agent may select a customer record to contact, at which point the agent desktop may dial a customer records such as a PEWC record 550, but also potentially a non-PEWC record using a secondary and non-automated simple dialer, constituting a human selection and dialing of a record, which is in accordance with laws in certain legal systems and jurisdictions. The agent desktop and data services engine may establish a tethered connection between a prior express written consent customer record and any designated recipient for the communication 560. In the case of non-PEWC records, the agent's selection is mandatory and auto-dial without human selection may not take place, before the customer record is dialed 570, and a data services engine establish a tethered connection between a designated recipient and the dialed customer number 580, wherein the designated recipient may be the selecting agent, a different agent, or a third party or alternative contact center system which may then decide which of their agents to utilize for the connection to the customer.

FIG. 6 is a directional method diagram similar to a flowchart, illustrating steps taken by a system for unified autodial campaign management, according to one embodiment. First, an enterprise representative or administrator must log into a campaign manager console 610. Logging into a CMC may be accomplished with a specialized application, a command line interface, a web browser, or some other software, over a network such as the Internet or a LAN, using a variety of possible protocols including TCP/IP, Telnet, SSH, and others. After logging into the console locally or remotely, an enterprise provides a list or lists of customer records 620, and if they are not already segregated based on PEWC Status, the system must segregate prior express written consent and non-prior express written consent records from a customer records list 630. For instance, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS 640 without any further processing. Non-PEWC records, however, may not be directly dialed by an ATDS under contemporary law in some legal codes and therefore they must be processed by agents rather than fully automatically dealt with, and are handled by another half of the flow diagram, in FIG. 7. Agents operating agent desktop software may specify themselves as being available for PEWC records if needed 660, which may be matched with PEWC records at the auto-dialer 650 so that if and when human interaction is needed in a customer interaction, an agent may handle the communication. PEWC customers may be autodialed and interact with automated systems or an agent 670.

FIG. 7 is a second half of a directional method diagram similar to a flowchart, illustrating steps taken by a system for unified autodial campaign management, according to one embodiment. After receiving non-PEWC customer records from an enterprise, through the use of a campaign management console, non-PEWC records are delivered to a traffic shaper 710, a software engine that determines how to organize record traffic either based on absolute numbers of records, or based on agent numbers, or based on some other configuration specified by a system administrator or enterprise when setting up their campaign. A traffic shaper may be part of, or may contain as part of it, a data services engine, or a data services engine may be a separate engine from such a traffic shaper, communications between the two being interprocess or intraprocess communications, or communications across a network. A data service engine may be queried by the traffic shaper to look for available agents 720, which agents may specify on their agent desktop software 730. The traffic shaper then, having at least an initial number of available agents, continues accruing non-PEWC records, until the number of records received passes some threshold, the threshold being either based on absolute numbers of records, or based on agent numbers, or based on some other configuration specified by a system administrator or enterprise when setting up their campaign 740. Once the threshold is achieved and a minimum number of non-PEWC records is reached, the traffic shaper sends the number of available agents to a control agent or agents 750, which are specialized agents operating a specialized clicker application that may select which records to go to which regular agent desktops, either in groups or range-selection or by individually selecting records and agents 760. The customer records and numbers are sent to a simple dialer that may dial the numbers for the customers and establish a tethered connection between the customer and the regular agents 770, the numbers being selected to be dialed by either the control agents or the regular agents, thereby having non-PEWC customers not autodialed but dialed by manual human selection and a simple dialer, and interacting with a human agent 780.

FIG. 8 is a method diagram illustrating an enterprise representative operating a campaign manager console to centrally manage a unified autodial campaign, according to an aspect. An enterprise customer representative (i.e., system administrator) may log into a campaign manager console, such as with a username and password that is tied to an enterprise profile registered with the CMC, and may specify inbound agent preference and/or outbound dialer agent preference 810 for a customer contact campaign. An enterprise customer may then upload their chosen list of customer records, which must include PEWC status 820 of the customers, or may upload them in separate lists if there are some PEWC and some non-PEWC customers spread across separated lists. The campaign manager console then sorts PEWC from non-PEWC records, and sends PEWC records to an ADTS to be dialed and connected with agents, whilst it sends non-PEWC records to a contact center system specified by enterprise 830 which may be contact center systems native to the operator of the unified autodial campaign management system, or may be a third party or on-premises option favored by the enterprise customer. An alternative contact center system's agents may then handle non-PEWC communications 840, and inbound calls may come to the campaign manager cloud 850 to be redirected to the chosen inbound agent provider, if different from a default provided solution by the unified autodial campaign management system operator 860.

Such connections between agents, an ATDS, and end customers, may be tethered connections that connect an internet-enabled device and software to a phone using a PSTN or internet connection (or sometimes both, as in the case of many modern smartphones).

FIG. 9 is a message flow diagram illustrating steps taken by a system for unified autodial campaign management, according to one embodiment, illustrating steps for the processing of customer record lists, segregation of such a list based on PEWC status, and dealing with the segregated records. Present in the system is at least campaign manager console 910, a traffic shaper 915, a data services engine 920, an agent desktop 925, and an ADTS 930. Cloud contact center manager 110, which constitutes a cloud service managing several software and hardware components including a campaign manager console 910, an Automatic Telephone Dialing System ("ATDS") 930, agent desktop software 925, a traffic shaper 915 engine, and a data services engine 920. Such services may be accessed independently or through a campaign manager console 910, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet, and may use any of a variety of protocols including SSH, Telnet, TCP/IP, UDP, and others. The campaign manager console 910 or "CMC" may be configured to be a central access point for users and administrators to access other parts of a cloud contact center manager, such as an ATDS 930 or traffic shaper 915, and may provide functionality for an administrator to create and manage a customer contact and autodialing campaign, including campaign duration, scope, customer records to contact, agent distribution and reservation settings, and agent integration with the system. Agent desktop software 925 may take the form of software operating on a virtual or physical desktop managed by the cloud system that an agent uses to set their own information such as availability and reservation status, and interact with received customer records, which may be received either directly from a CMC 910 or from data services 920 that determine which agents to send which records after a traffic shaper 915 determines how to organize the traffic from customer records to agents. A traffic shaper 915 may be a separate component to a CMC, or may be software that operates as part of the CMC 910, and determines based on the specifications of the campaign from the CMC 910 when enough customer records of PEWC or non-PEWC status are available to start reserving and interacting with agents, and sends the records to a data services engine 920, potentially with data about which agents or section of agents may be preferred for which customer records or sections of customer records. Alternatively, the data services engine 920 may make this determination about which agents are relegated to which customer records. An administrator may be a member or representative of an enterprise, an enterprise being a user of the cloud contact center manager to operate a customer contact campaign using the CMC 910 over a network such as the Internet. The enterprise must upload in some format, a list of customer records, comprising either or both of PEWC and non-PEWC customer records, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The cloud contact center manager may use, at some point during its operation, an ATDS 930 and/or agent desktop 925 to dial out to customers, using a Public Switched Telephone Network ("PSTN"), using methods described herein. First, after an enterprise provides a list or lists of customer records, if they are not already segregated based on PEWC Status, the system must segregate prior express written consent and non-prior express written consent records from a customer records list.

One way in which this may be accomplished is by segregating which phone numbers are mobile numbers, by inspecting the first several digits of the phone number, from landline numbers. Landline numbers are not subject to the same legal restrictions such as the Telephone Consumer Protection Act ("TCPA") in some jurisdictions or nations. After determining which numbers are landline and which are mobile, mobile numbers are checked against a database to determine if consent was provided for the number, while landlines may be checked in a separate database or other data storage solution to determine if the landline is ported to a mobile device, and if it has been, determine if consent has been given in the first database again.

Another method may be, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS without any further processing 935. Non-PEWC records, however, may not be directly dialed by an ATDS under contemporary law in some legal codes and therefore they must be processed by agents rather than fully automatically dealt with. First the non-PEWC records are sent to a traffic shaper 940 which is a software application that may operate as part of the same system or a separate but connected system to the CMC, and may involve communication over a network such as a LAN or WAN. The traffic shaper receives the records, at which point it may make a request to reserve agents for the purpose of handling outbound non-PEWC customer communications, to a data services engine 945, once the number of non-prior express written consent records crosses a threshold. The agent availability numbers depend on agent desktop statuses 925, for instance an agent may specify that they are busy or taking a break, or otherwise unable or unwilling to handle non-PEWC records at the moment of polling. The threshold may be specified by an enterprise in the CMC for their specific campaign, or may be a configuration common to multiple enterprises and campaigns, or may be universal across all instances or uses of the CMC. The threshold may also be dynamic or programmatically defined, such as a certain percentage of the total number of records, or a number related to how many agents exist in the system to begin with. After that request is made, the data services engine may communicate with connected agent desktop software that is integrated into or otherwise connected to the cloud system, or listed in the data services engine configuration, to account for all available agents that may be specified for availability with either or both of prior express written consent or non-prior express written consent customers, to accurately determine the number of agents that can handle the customer records at hand 945. It may then reserve these agents for certain customers based on a request or requests from a traffic shaper, or reserve them merely for activity, meaning they cannot be scheduled for other activities until otherwise changed, but allow them to decide which customer to contact from a possible sub-list of customer records, such as if there are more customer records than agents 950.

FIG. 10 is a message flow diagram illustrating further steps taken by a system for unified autodial campaign management, according to one embodiment, illustrating steps for facilitating tethered connections between agent desktops and an auto-dialer and the customer reached by an auto-dialer, and the interaction of agent desktop software with customer records to determine the customers to contact and connect with specific agents. Present in the system is at least campaign manager console 1010, a traffic shaper 1015, a data services engine 1020, an agent desktop 1025, and an ADTS 1030. Cloud contact center manager 110, which constitutes a cloud service managing several software and hardware components including a campaign manager console 1010, an Automatic Telephone Dialing System ("ATDS") 1030, agent desktop software 1025, a traffic shaper 1015 engine, and a data services engine 1020. Such services may be accessed independently or through a campaign manager console 1010, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet, and may use any of a variety of protocols including SSH, Telnet, TCP/IP, UDP, and others. The campaign manager console 1010 or "CMC" may be configured to be a centrally access point for users and administrators to access other parts of a cloud contact center manager, such as an ATDS 1030 or traffic shaper 1015, and may provide functionality for an administrator to create and manage a customer contact and auto-dialing campaign, including campaign duration, scope, customer records to contact, agent distribution and reservation settings, and agent integration with the system. Agent desktop software 1025 may take the form of software operating on a virtual or physical desktop managed by the cloud system that an agent uses to set their own information such as availability and reservation status, and interact with received customer records, which may be received either directly from a CMC 1010 or from data services 1020 that determine which agents to send which records after a traffic shaper 1015 determines how to organize the traffic from customer records to agents. A traffic shaper 1015 may be a separate component to a CMC, or may be software that operates as part of the CMC 1010, and determines based on the specifications of the campaign from the CMC 1010 when enough customer records of PEWC or non-PEWC status are available to start reserving and interacting with agents, and sends the records to a data services engine 1020, potentially with data about which agents or section of agents may be preferred for which customer records or sections of customer records. Alternatively, the data services engine 1020 may make this determination about which agents are relegated to which customer records. An administrator may be a member or representative of an enterprise, an enterprise being a user of the cloud contact center manager to operate a customer contact campaign using the CMC 1010 over a network such as the Internet. The enterprise must upload in some format, a list of customer records, comprising either or both of PEWC and non-PEWC customer records, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The cloud contact center manager may use, at some point during its operation, an ATDS 1030 and/or agent desktop 1025 to dial out to customers, using a Public Switched Telephone Network ("PSTN"), using methods described herein. A data services engine may facilitate a tethered connection between an agent desktop and an auto-dialer 1035, such that the agent desktop software may be connected to an end customer's phone (whether cellular or not), the agent desktop being possibly hosted in the same cloud platform as the data services engine and a CMC, or possibly being hosted and operated by a separate cloud or third party contact center system. The data services engine may also allow contact center agents to establish agent availability, reserve themselves for PEWC or non-PEWC customer contacts, and reserve themselves for inbound or outbound communications, allowing the data services engine to determine which agents to send records to and tether connections to 1040. In the process of determining which agents to tether to which customers, an agent desktop may display at least one customer number from at least one customer record delivered from a data services engine, such as on a computer monitor screen, to allow agents to interact with the at least one customer record such as by clicking or otherwise selecting a customer record 1045. When a customer record is selected, it may display other information about the customer, and may provide contextual menus or information to the agent, depending on the implementation. An agent may select a customer record to contact, at which point the agent desktop may automatically dial a customer records such as a PEWC record, but also potentially a non-PEWC record, constituting a human selection and dialing of a record, which is in accordance with laws in certain legal systems and jurisdictions 1050. The agent desktop and data services engine may establish a tethered connection between a prior express written consent customer record and any designated recipient for the communication. In the case of non-PEWC records, the agent's selection is mandatory and auto-dial without human selection may not take place, before the customer record is dialed, and a data services engine establish a tethered connection between a designated recipient and the dialed customer number 1055, wherein the designated recipient may be the selecting agent, a different agent, or a third party or alternative contact center system which may then decide which of their agents to utilize for the connection to the customer.

FIG. 15 is a block diagram illustrating an exemplary consumer mobile device operating a consent software application (consent app) 1550 which is configured to connect with centralized campaign manager 1110 in order for a user of the mobile device to provide consent for calls, according to an embodiment. Consumer mobile device 1500 may connect with CCM 1110 via a communication network, such as the Internet. According to the embodiment, consumer mobile device 1500 may comprise hardware 1510 such as, for example, one or more processors capable of executing machine readable instructions, a radio frequency transceiver, a digital signal processing unit, a SIM or USIM card, power control, and a battery. Consumer device 1500 may further comprise a plurality of sensors 1520 which can be either hardware or software based sensors. Examples of sensors may include, but are not limited to, cameras, microphones, speakers, GPS systems, barometers, gyroscopes, thumbprint scanner, and accelerometers. Sensors 1520 may be used by a consent app 1550 to gather biometric data associated with the user of consumer mobile device 1500. Consumer mobile device 1500 may further comprise a memory 1530 where various software applications (apps) 1540, a consent app 1550, and biometric profile data 1560 can be stored. Consumer mobile device 1500 may further comprise firmware and an operating system (OS) stored in memory 1530. Apps 1540 may comprise any app which is stored and operated on the consumer mobile device 1500 and can include, though not limited to, messaging applications, email applications, social media applications, mobile game applications, and many more other possible types of applications that may be operated by a mobile device. A consent app 1550 may be present which is a specifically configured software application designed to connect with CCM 1110 via one or more digital channels in order to obtain electronic consent from the user of the consumer mobile device 1500. The consent app may be downloaded any suitable software application marketplace such as the APPLE APP STORE™ or GOOGLE PLAY STORE™. The consent app may be created using any suitable coding language known in the art, for example, Objective-C, Swift, Python, C#, C/C++, Java, Scala, and JavaScript to name a few.

Consent app 1550 may be configured to integrate with other apps 1540 stored on consumer mobile device 1500. The mobile device 1500 user can grant permission for consent app 1550 to access other apps 1540 to facilitate such integrations. Consent app 1550 can be configured to display messages received, via one or more digital channels, from CCM 1110 via a built-in messaging service. Alternatively, or additionally, if permission to access other device apps 1540 has been granted, consent app 1550 can receive messages from CCM 1110 and forward the messages to an appropriate endpoint (e.g., app or service) on the consumer mobile device 1500. For example, CCM 1110 generates an email message with an embedded link to obtain consent for calls which is sent to consumer mobile device 1500, received by consent app 1550, and then forwarded to the default email app stored and operating on the consumer mobile device 1500. In this way, consent app 1550 can serve as a central hub on the consumer mobile device 1500 which receives and displays messages received via one or more digital channels, or consent app 1550 can function as a distribution hub for received messages ensuring that each message is sent to its appropriate default endpoint on the consumer mobile device 1500.

Consent app 1550 may be configured to periodically send device data to CCM 1110 which may be used by list manager 1112 to perform list management functions such as adding/removing numbers to lists based on need and/or opportunity detection as determined using the device data. Device data may comprise events and actions performed within the consent app 1550 ecosystem and may also comprise device data obtained from other apps 1540 operating on consumer mobile device 1500, if the device user has granted permission for consent app 1550 to access other applications and services operating on his or her mobile device. Information related to, but not necessarily limited to, social media, email, text, calls, and various other application data may be gathered by consent app 1550 and sent to CCM 1110 for further processing.

Present in the consent app 1550 may be one or more services configured to represent various digital channels which may be used by CCM 1110 to exchange messages and to obtain consent from the user of the mobile device 1500. One such service is a blockchain service 1551, which a user of consent app 1550 can opt into, is configured to store blockchain information relevant to the user, such as the user's unique address on blockchain network, and to facilitate smart contract functionality between CCM 1110 and the user. Blockchain service 1551 may be a portal accessible through consent app 1550 which allows mobile device 1500 users to be informed of the creation of a smart contract, and to view a smart contract as created by CCM 1110. A smart contract may be created which requests consent for call from the mobile device 1500 user, and responsive to obtaining consent, directing the CMC 1111 and/or ATDS 1160*a-n*, 1132 to initiate a call to the user.

Also present in the consent app 1550 is a biometric service 1552 configured to receive biometric data associated with the mobile device 1500 user from one or more sensors 1520 in order to create a biometric profile of the user which can be used for authentication and consent purposes. Similar to the blockchain service 1551, the user can decide to opt into biometric services 1552 provided by consent app 1550. A biometric profile may comprise biometric features unique to the mobile device 1500 user such as, for example, extracted unique facial features, a voice print, a user gait, fingerprints, retinal information, and the like. User authentication may be performed after a biometric profile of the user has been established by receiving biometric data from one or more sensors 1520 and comparing that biometric data against the stored biometric profile data 1560 in order to authenticate the user of the mobile device 1500. This authentication process may also be used to provide consumer consent for calls. For example, digital consent manager 1113 may generate a message, which is sent to the consumer mobile device 1500 and received by consent app 1550, which asks the user to provide consent using biometric authentication. The user may proceed to authenticate themselves (e.g., by speaking into the microphone, by taking a photograph/video of themselves, by walking, etc.) using biometric data, and after the user has been authenticated biometric service 1552 may send back to CCM 1110 user consent. In some embodiments, by simply opting into biometric service and establishing a biometric profile, the mobile device 1500 user consents to potential future calls. In another embodiment, biometric profile data 1560 may be stored at CCM 1110 in an encrypted database. In other embodiments, biometric profile data 1560 may be stored both locally in the memory 1530 of the consumer mobile device 1500, and at CCM 1110.

According to the embodiment, biometric service 1552 may comprise at least one of an automated speech recognition (ASR) system 1553 and an image processing engine 1554. ASR 1553 may be used to extract unique features associated with a user's voice from audio data gathered from the microphone in order to create a voice print unique to the user of mobile device 1500. IPE 1554 may be used to process received image data to extract unique facial features associated with the user of mobile device 1500. Biometric data extracted by ASR 1553 and/or IPE 1554 may be stored as biometric profile data 1560 and can be used for user authentication and consent acquisition purposes.

FIG. 16 is a message flow diagram illustrating steps taken by a system for advanced consent management, according to one embodiment, illustrating steps for the processing of customer record lists, segregation of such a list based on PEWC status, and dealing with the segregated records. Present in the system is at least campaign manager console 1610, a digital consent manager 1615, a consumer mobile device 1620, a list manager 1625, and one or more ADTS 1630. Centralized campaign manager 1110, which constitutes a cloud service managing several software and hardware components including a campaign manager console 1610, an Automatic Telephone Dialing System ("ATDS") 1630, agent desktop software 1131, a traffic shaper 1114 engine, and a data services engine 1115. Such services may be accessed independently or through a campaign manager console 1610, which may constitute a software application or applications running on a single server, a plurality of servers, or in a third party cloud service, that may connect with users either physically at a terminal or across a network connection. Such a network connection may be a Local Area Connection ("LAN") or a Wide Area Connection ("WAN") such as the Internet, and may use any of a variety of protocols including SSH, Telnet, TCP/IP, UDP, and others. The campaign manager console 1610 or "CMC" may be configured to be a central access point for users and administrators to access other parts of centralized campaign manager 1110, such as an ATDS 1630 or traffic shaper 1115, and may provide functionality for an administrator to create and manage a customer contact and autodialing campaign, including campaign duration, scope, customer records to contact, agent distribution and reservation settings, and agent integration with the system. Agent desktop software 1131 may take the form of software operating on a virtual or physical desktop managed by the cloud system that an agent uses to set their own information such as availability and reservation status, and interact with received customer records, which may be received either directly from a CMC 1610 or from data services 1115 that determine which agents to send which records after a traffic shaper 1114 determines how to organize the traffic from customer records to agents. A traffic shaper 1114 may be a separate component to a CMC, or may be software that operates as part of the CMC 1610, and determines based on the specifications of the campaign from the CMC 1610 when enough customer records of PEWC or non-PEWC status are available to start reserving and interacting with agents, and sends the records to a data services engine 1115, potentially with data about which agents or section of agents may be preferred for which customer records or sections of customer records. Alternatively, the data services engine 1115 may make this determination about which agents are relegated to which customer records. An administrator may be a member or representative of an enterprise, an enterprise being a user of the cloud contact center manager to operate a customer contact campaign using the CMC 1610 over a network such as the Internet. The enterprise must upload in some format, a list of customer records, comprising either or both of PEWC and non-PEWC customer records, either as separate lists or in one single combined list, though they must be marked or recorded as being PEWC or non-PEWC customer records if they are in a mingled list. The format of such a list may be raw text, a spreadsheet document, a .csv, a database table, direct connection to a database, or some other format for sharing data that may be common in the art. The centralized campaign manager may use, at some point during its operation, one or more ATDS 1630 and/or agent desktop 1131 to dial out to customers, using a Public Switched Telephone Network ("PSTN"), using methods described herein. First, after an enterprise provides a list or lists of customer records, if they are not already segregated based on PEWC Status, the system must segregate prior express written consent and non-prior express written consent records from a customer records list.

One way in which this may be accomplished is by segregating which phone numbers are mobile numbers, by inspecting the first several digits of the phone number, from landline numbers. Landline numbers are not subject to the same legal restrictions such as the Telephone Consumer Protection Act ("TCPA") in some jurisdictions or nations. After determining which numbers are landline and which are mobile, mobile numbers are checked against a database to determine if consent was provided for the number, while landlines may be checked in a separate database or other data storage solution to determine if the landline is ported to a mobile device, and if it has been, determine if consent has been given in the first database again.

Another method may be, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS without any further processing 1635. Non-PEWC records, however, may not be directly dialed by an ATDS under contemporary law in some legal codes and therefore they must be processed by agents rather than fully automatically dealt with. First the non-PEWC records are sent to a digital consent manager 1640 which is a software application that may operate as part of the same system or a separate but connected system to the CMC, and may involve communication over a network such as a LAN or WAN. The digital consent manager 1615 receives the records, at which point it may generate a message to make a request for a consumer's electronic consent via one or more digital channels for the purpose of receiving telephone calls, to a consumer mobile device 1645. Digital consent manager 1615 may wait for a response from consumer mobile device 1620 indicating whether consent was obtained or not. A user of consumer mobile device 1620 may respond to the message by consenting to be called 1650 wherein the response is received by digital consent manager 1615. This consent data may be passed 1655 to list manager 1625 which can update the consent status of customer records stored in one or more lists. An updated list may be associated with an active callback campaign and can be retrieved by CMC 1610 in order to send the updated customer record to an ATDS 1660. In this way, this system can obtain consent for non-PEWC records via a digital channel connecting the system with a consumer mobile device 1620, wherein the customer can provide consent via an electronic means using the digital channel.

If digital consent manager 1615 cannot obtain consent via a digital channel for a non-PEWC record, the non-PEWC records are sent to a traffic shaper 1114 which is a software application that may operate as part of the same system or a separate but connected system to the CMC, and may involve communication over a network such as a LAN or WAN. The traffic shaper receives the records, at which point it may make a request to reserve agents for the purpose of handling outbound non-PEWC customer communications, to a data services engine 1115, once the number of non-prior express written consent records crosses a threshold. The agent availability numbers depend on agent desktop statuses, for instance an agent may specify that they are busy or taking a break, or otherwise unable or unwilling to handle non-PEWC records at the moment of polling. The threshold may be specified by an enterprise in the CMC for their specific campaign, or may be a configuration common to multiple enterprises and campaigns, or may be universal across all instances or uses of the CMC. The threshold may also be dynamic or programmatically defined, such as a certain percentage of the total number of records, or a number related to how many agents exist in the system to begin with. After that request is made, the data services engine may communicate with connected agent desktop software that is integrated into or otherwise connected to the cloud system, or listed in the data services engine configuration, to account for all available agents that may be specified for availability with either or both of prior express written consent or non-prior express written consent customers, to accurately determine the number of agents that can handle the customer records at hand. It may then reserve these agents for certain customers based on a request or requests from a traffic shaper, or reserve them merely for activity, meaning they cannot be scheduled for other activities until otherwise changed, but allow them to decide which customer to contact from a possible sub-list of customer records, such as if there are more customer records than agents.

FIG. 17 is a flow diagram illustrating an exemplary method for advanced consent management for outbound calling campaigns utilizing digital channels and auto-dialers, according to an aspect. First, an enterprise representative or administrator must log into a campaign manager console. Logging into a CMC may be accomplished with a specialized application, a command line interface, a web browser, or some other software, over a network such as the Internet or a LAN, using a variety of possible protocols including TCP/IP, Telnet, SSH, and others. After logging into the console locally or remotely, an enterprise provides a list or lists of customer records 1705, and if they are not already segregated based on PEWC status, the system must segregate prior express written consent and non-prior express written consent records from a customer list 1710. For instance, if a database table is exported to .csv format and uploaded to a campaign management console, and each customer record has a field for "PEWC" that is either true or false, the campaign management console must separate the customer records with a "true" value in the "PEWC" field from the ones with a "false" or null value in the "PEWC" field. After this is accomplished, or if the list is already delivered in segregated format thereby bypassing the need for the campaign management console to segregate the list, the PEWC records may be delivered to an auto-dialer such as an ATDS 1750 without any further processing. Non-PEWC records, however, may not be directly dialed by an ATDS under contemporary law in some legal codes and therefore they must be processed by a digital consent manager in order to obtain customer consent. Agents operating agent desktop software may specify themselves as being available for PEWC records if needed, which may be matched with PEWC records at the auto-dialer 1755 so that if and when human interaction is needed in a customer interaction, an agent may handle the communication. PEWC customers may be autodialed and interact with automated systems or an agent 1760.

Non-PEWC records are processed separately from PEWC records. Non-PEWC records are delivered to a digital consent manager 1715 which is configured to attempt to obtain customer consent for calls, via one or more digital channels connecting the system with a customer's mobile device through a software application (e.g., consent app 1550) stored and operating on the mobile device. Digital consent manager can parse the non-PEWC customer records to identify parameters that indicate a customer's available and/or preferred digital channels of communication. If any such parameters are available, then the customer records may be grouped into sub-lists based on digital channel parameter 1720. For example, a sub-list may comprise customer records which all have the same digital channel preference parameter, and then this sub-list can be fed to the appropriate digital channel connector or module to connect with a customer mobile device. For each record in a list or sub-list a message is generated, the message requesting user consent for calls, which is appropriately formatted for the particular digital channel that the message is to be sent over 1725. For example, if the digital channel is a social media channel, then a generated message may comply with character limits (e.g., 160 character limit per post, etc.). As another example, if the digital channel is an email service, then the generate message may be formatted with a header and a body and addressed to the proper email address. A properly formatted message is then sent, via the appropriate digital channel, to a customer's mobile device 1730 and received at the consent app 1735, or forwarded to the appropriate mobile device endpoint (e.g., email service, text messaging app, etc.) by the consent app, if the mobile device user has granted permission for consent app to access other apps and services available on the user's mobile device. Once the message is received, the customer can choose to provide consent or not to provide consent 1740. The way a customer provides consent may be dependent upon the digital channel used. Furthermore, the message asking for consent may provide instructions on how to provide consent. For example, if the digital channel used for consent is via biometric module 1422 then the message may state something along the lines of "If you would like to consent to receive a call from Enterprise regarding your music service account, please provide biometric authentication by taking a photo of yourself via the consent app.", and the customer, if they chose to provide consent could take a photo of themselves and the biometric service 1552 of the consent app can authenticate the user using stored biometric profile data to compare against the photo of the customer. Once authenticated, the consent app may pass the customer's consent data back to digital consent manager which can either directly update PEWC records, or pass the consent data to a list manager which can update a consent list database. At this point the newly acquired consenting customer record (i.e., a new PEWC record) can be sent to an auto-dialer at step 1750. If instead, the customer does not provide consent, then the non-PEWC records are delivered to a traffic shaper at step 1745. Once at the traffic shaper, the non-PEWC records may be processed in a manner similar to the method described in FIG. 7.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the aspects disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific aspects, at least some of the features or functionalities of the various aspects disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some aspects, at least some of the features or functionalities of the various aspects disclosed herein may be implemented in one or more virtualized computing environments (e.g., network computing clouds, virtual machines hosted on one or more physical computing machines, or other appropriate virtual environments).

Referring now to FIG. 18, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some aspects, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 18 illustrates one specific architecture for a computing device 10 for implementing one or more of the aspects described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, a single processor 13 handles communications as well as routing computations, while in other aspects a separate dedicated communications processor may be provided. In various aspects, different types of features or functionalities may be implemented in a system according to the aspect that includes a client device (such as a tablet device or smartphone running client software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the aspects described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device aspects may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

In some aspects, systems may be implemented on a standalone computing system. Referring now to FIG. 19, there is shown a block diagram depicting a typical exemplary architecture of one or more aspects or components thereof on a standalone computing system. Computing device 20 includes processors 21 that may run software that carry out one or more functions or applications of aspects, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 18). Examples of storage devices 26 include flash memory, magnetic hard drive, CD-ROM, and/or the like.

In some aspects, systems may be implemented on a distributed computing network, such as one having any number of clients and/or servers. Referring now to FIG. 20, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 19. In addition, any number of servers 32 may be provided for handling requests received from one or more clients 33. Clients 33 and servers 32 may communicate with one another via one or more electronic networks 31, which may be in various aspects any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some aspects, servers 32 may call external services 37 when needed to obtain additional information, or to refer to additional data concerning a particular call. Communications with external services 37 may take place, for example, via one or more networks 31. In various aspects, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises. In addition to local storage on servers 32, remote storage 38 may be accessible through the network(s) 31.

In some aspects, clients 33 or servers 32 (or both) may make use of one or more specialized services or appliances that may be deployed locally or remotely across one or more networks 31. For example, one or more databases 34 in either local or remote storage 38 may be used or referred to by one or more aspects. It should be understood by one having ordinary skill in the art that databases in storage 34 may be arranged in a wide variety of architectures and using a wide variety of data access and manipulation means. For example, in various aspects one or more databases in storage 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some aspects, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some aspects may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with aspects without limitation, unless a specific security 36 or configuration system 35 or approach is specifically required by the description of any specific aspect.

In various aspects, functionality for implementing systems or methods of various aspects may be distributed among any number of client and/or server components. For example, various software modules may be implemented for performing various functions in connection with the system of any particular aspect, and such modules may be variously implemented to run on server and/or client components.

The skilled person will be aware of a range of possible modifications of the various aspects described above. Accordingly, the present invention is defined by the claims and their equivalents.

What is claimed is:

1. A system for centralized multichannel campaign management, comprising:
a digital consent manager comprising at least a first plurality of programming instructions stored in the at least one memory of, and operating on at least one processor of, the computer system, wherein the first plurality of programming instructions, when operating on the at least one processor, cause the computer system to:
receive a customer records list comprising a plurality of customer records without prior express written consent, where each record comprises a corresponding phone number and parameters specific to the phone number;
parse a customer record to identify a parameter that indicates a digital channel associated with a customer;
establish a connection with the customer mobile device via the identified digital channel;
generate and send a message to the customer mobile device via the identified digital channel, wherein the message comprises a request for customer consent;
receive a response to the message from the customer mobile device, wherein the response comprises an indication of consent and a campaign type; and
update the customer record based on the indication of consent, wherein updating the customer record causes the customer record to be added to a customer records list comprising a plurality of customer records with prior express written consent, wherein each record comprises a corresponding customer phone number, campaign type, and parameters specific to the phone number; and
a customer mobile device, the customer mobile device comprising at least a first plurality of programming instructions stored in at least one memory of, and operating on at least one processor of, the mobile device, wherein the first plurality of programming instructions, when operating on the at least one processor, cause the mobile device to:
connect with the digital consent manager via the digital channels;
receive the message via the digital channels; and
send the response to the message to the digital consent manager, wherein the response comprises the indication of consent; and
a campaign manager console comprising at least a second plurality of programming instructions stored in the at least one memory of, and operating on at least one processor of, the computer system, wherein the second plurality of programming instructions, when operating on the at least one processor, cause the computer system to:
select and deliver a prior express written consent record to an auto-dialer; and
an auto-dialer comprising at least a third plurality of programming instructions stored in the at least one memory of, and operating on at least one processor of, the computer system, wherein the third plurality of programming instructions, when operating on the at least one processor, cause the computer system to:
automatically dial a corresponding customer phone number of a received prior express written consent customer record; and
establish a tethered connection between one or more communications devices and the dialed corresponding customer phone number.

2. The system of claim 1, wherein the digital channel is a blockchain network.

3. The system of claim 2, wherein the message is a smart contract executed on the blockchain network, the smart contract comprising a request for customer consent, and wherein the customer record is stored on a blockchain of the blockchain network.

4. The system of claim 1, wherein the digital channel uses biometric authentication to obtain consent.

5. The system of claim 4, wherein the customer mobile device is further configured to:
store a biometric profile associated with the user of the customer mobile device;
receive biometric data from one or more on device sensors; and
provide consent by authenticating the mobile device user, wherein authentication is performed by comparing the biometric data with the stored biometric profile and indicating a positive or negative match.

6. The system of claim 1, wherein the digital channel is an email service, a messaging service, a social media service, an embedded link, or a scannable barcode.

7. The system of claim 1, further comprising an agent desktop comprising at least a fourth plurality of programming instructions stored in the at least one memory of, and operating on at least one processor of, the computer system, wherein the fourth plurality of programming instructions, when operating on the at least one processor, cause the computer system to:
display one or more non-prior express written consent customer records; and
forward at least one non-prior express written consent customer record to the auto-dialer.

8. The system of claim 7, further comprising a data services engine comprising at least a fifth plurality of programming instructions stored in the at least one memory of, and operating on at least one processor of, the computer system, wherein the fifth plurality of programming instructions, when operating on the at least one processor, cause the computer system to:
determine availability of the agent desktop for one or more non-prior express written consent customers;
reserve the agent desktop for the one or more non-prior express written consent customers; and
tether a connection between the agent desktop and an auto-dialer.

9. The system of claim 8, further comprising a traffic shaper comprising at least a sixth plurality of programming instructions stored in the at least one memory of, and operating on at least one processor of, the computer system, wherein the sixth plurality of programming instructions, when operating on the at least one processor, cause the computer system to:
receive non-prior express written consent records; and
request to reserve agents from the data services engine once non-prior express written consent record numbers cross a predetermined threshold.

10. The system of claim 7, wherein all non-prior express written consent customer records are dialed with a simple dialer rather than an auto-dialer, wherein the agent desktop interaction with the at least one non-prior express written consent customer record forwards the customer record with a corresponding phone number to a simple dialer; and
further comprising a simple dialer comprising at least a seventh plurality of programming instructions stored in the at least one memory of, and operating on at least one processor of, the computer system, wherein the seventh plurality of programming instructions, when operating on the at least one processor, cause the computer system to:
receive a forwarded non-prior express written consent customer record from an agent desktop;
dial the customer number that has been forwarded from an agent desktop; and
establish a tethered connection between a prior express written consent customer record and one or more communication devices, after dialing a number.

11. A method for centralized multichannel campaign management, comprising the steps of:
receiving, using digital consent manager, a customer records list comprising a plurality of customer records without prior express written consent, where each record comprises a corresponding phone number and parameters specific to the phone number;
parsing, using the digital consent manager, a customer record to identify a parameter that indicates a digital channel associated with a customer;
establishing, using the digital consent manager, a connection with the customer mobile device via the identified digital channel;
generating, using the digital consent manager, and send a message to the customer mobile device via the identified digital channel, wherein the message comprises a request for customer consent;
receiving, using the digital consent manager, a response to the message from the customer mobile device, wherein the response comprises an indication of consent and a campaign type;
updating, using the digital consent manager, the customer record based on the indication of consent, wherein updating the customer record causes the customer record to be added to a customer records list comprising a plurality of customer records with prior express written consent, wherein each record comprises a corresponding customer phone number, campaign type, and parameters specific to the phone number;
connecting, using a customer mobile device, with the digital consent manager via the digital channels;
receiving, using the customer mobile device, the message via the digital channels;
sending, using the customer mobile device, the response to the message to the digital consent manager, wherein the response comprises the indication of consent;
selecting and delivering, using a campaign manager console, a prior express written consent record to an auto-dialer;
automatically dialing, using an auto-dialer, a corresponding customer phone number of a received prior express written consent customer record; and
establishing, using the auto-dialer, a tethered connection between one or more communications devices and the dialed corresponding customer phone number.

12. The method of claim 11, wherein the digital channel is a blockchain network.

13. The method of claim 12, wherein the message is a smart contract executed on the blockchain network, the smart contract comprising a request for customer consent, and wherein the customer record is stored on a blockchain of the blockchain network.

14. The method of claim 11, wherein the digital channel uses biometric authentication to obtain consent.

15. The method of claim 14, wherein the customer mobile device is further configured to perform the steps of:
storing a biometric profile associated with the user of the customer mobile device;
receiving biometric data from one or more on device sensors; and
providing consent by authenticating the mobile device user, wherein authentication is performed by comparing the biometric data with the stored biometric profile and indicating a positive or negative match.

16. The method of claim 11, wherein the digital channel is an email service, a messaging service, a social media service, an embedded link, or a scannable barcode.

17. The method of claim 11, further comprising the steps of:
displaying, using an agent desktop, one or more non-prior express written consent customer records; and
forwarding, using the agent desktop, at least one non-prior express written consent customer record to the auto-dialer.

18. The method of claim 17, further comprising the steps of:
determining, using a data services engine, availability of the agent desktop for one or more non-prior express written consent customers;
reserving, using the data services engine, the agent desktop for the one or more non-prior express written consent customers;
tethering, using the data services engine, a connection between the agent desktop and an auto-dialer.

19. The method of claim 18, further comprising the steps of:
receiving, using a traffic shaper, non-prior express written consent records; and
requesting, using the traffic shaper, to reserve agents from the data services engine once non-prior express written consent record numbers cross a predetermined threshold.

20. The method of claim 17, wherein all non-prior express written consent customer records are dialed with a simple dialer rather than an auto-dialer, wherein the agent desktop interaction with the at least one non-prior express written consent customer record forwards the customer record with a corresponding phone number to a simple dialer; and
further comprising the steps of:
receiving, using a simple dialer, a forwarded non-prior express written consent customer record from an agent desktop;
dialing, using the simple dialer, the customer number that has been forwarded from an agent desktop; and
establishing, using the simple dialer, a tethered connection between a prior express written consent customer record and one or more communication devices, after dialing a number.

* * * * *